(12) United States Patent
Backhaus-Ricoult et al.

(10) Patent No.: US 10,029,939 B2
(45) Date of Patent: Jul. 24, 2018

(54) CERAMIC COMPOSITE BEADS AND METHODS FOR MAKING SAME

(71) Applicant: CORNING INCORPORATED, Corning, NY (US)

(72) Inventors: Monika Backhaus-Ricoult, Bourron (FR); Daniel Robert Boughton, Naples, NY (US); Jennifer Anella Heine, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 394 days.

(21) Appl. No.: 14/633,695

(22) Filed: Feb. 27, 2015

(65) Prior Publication Data

US 2016/0251249 A1   Sep. 1, 2016

(51) Int. Cl.
*C03B 19/10* (2006.01)
*C03C 10/00* (2006.01)
(Continued)

(52) U.S. Cl.
CPC .......... *C03B 19/10* (2013.01); *B01D 46/2418* (2013.01); *C01F 7/025* (2013.01); *C01F 7/027* (2013.01); *C01G 23/003* (2013.01); *C03C 10/00* (2013.01); *C03C 10/0009* (2013.01); *C03C 12/00* (2013.01); *C04B 35/185* (2013.01); *C04B 35/195* (2013.01); *C04B 35/443* (2013.01); *C04B 35/478* (2013.01); *C04B 35/62655* (2013.01); *C04B 35/62665* (2013.01); *C04B 35/62675* (2013.01); *C04B 35/6316* (2013.01); *C01P 2002/72* (2013.01); *C01P 2004/03* (2013.01); *C01P 2004/30* (2013.01);
(Continued)

(58) Field of Classification Search
None
See application file for complete search history.

(56) References Cited

U.S. PATENT DOCUMENTS 6,376,084 B1 * 4/2002 Kishimoto .............. C03C 3/062
                                                      501/69
7,964,262 B2   6/2011 Brocheton et al.
(Continued)

FOREIGN PATENT DOCUMENTS

JP    2002187729 A   12/2000

OTHER PUBLICATIONS

Zhou et al. "Superplasticity of zirconia-alumina-spinel nanoceramic composite by spark plasma sintering of plasma sprayed powders", Materials Science and Engineering A: Structural Materials: Properties, Microstructures Processing, Elsevier BV, NL, vol. 394, No. 1-2. Mar. 15, 2005 pp. 353-359 XP027791312.

(Continued)

*Primary Examiner* — Nicholas W. Jordan

(57) ABSTRACT

Methods for making a ceramic or glass-ceramic include spray-drying a mixture comprising batch materials to form agglomerated particles; bringing the agglomerated particles into contact with a plasma for a residence time sufficient to form fused particles; and annealing the fused particles at a temperature and for a time sufficient to form ceramic or glass-ceramic particles. The methods can be used to produce fused glass particles, ceramic or glass-ceramic particles, and ceramic or glass-ceramic articles, such as ceramic honeycombs.

7 Claims, 32 Drawing Sheets

(51) Int. Cl.
*B01D 46/24* (2006.01)
*C01G 23/00* (2006.01)
*C01F 7/02* (2006.01)
*C03C 12/00* (2006.01)
*C04B 35/185* (2006.01)
*C04B 35/195* (2006.01)
*C04B 35/443* (2006.01)
*C04B 35/478* (2006.01)
*C04B 35/626* (2006.01)
*C04B 35/63* (2006.01)

(52) U.S. Cl.
CPC ...... *C01P 2004/50* (2013.01); *C01P 2004/51* (2013.01); *C01P 2004/61* (2013.01); *C04B 2235/3206* (2013.01); *C04B 2235/3229* (2013.01); *C04B 2235/3418* (2013.01); *C04B 2235/528* (2013.01); *C04B 2235/5436* (2013.01); *C04B 2235/80* (2013.01); *C04B 2235/9607* (2013.01)

(56) References Cited

U.S. PATENT DOCUMENTS

2008/0092804 A1* 4/2008 Hansen .................. C03C 17/30
428/426
2010/0255978 A1* 10/2010 Rosenflanz ............. C03C 3/068
501/15
2012/0148792 A1* 6/2012 Okazaki ................ C04B 35/195
428/116
2012/0177875 A1* 7/2012 Beall ..................... C04B 35/195
428/116
2014/0338296 A1 11/2014 Backhaus-Ricoult et al.
2014/0339744 A1 11/2014 Backhaus-Ricoult et al.
2014/0342898 A1 11/2014 Backhaus-Ricoult et al.

OTHER PUBLICATIONS

Balasubramanian et al. "Sinter forging of rapidly quenched eutectic Al2O3-ZrO2 (Y2O3-glass powders", Journal of the European Ceramic Society, Elsevier Science Publishers, vol. 25 No. 8, pp. 1359-1364.

Lallemand et al, "Fabrication process of spinet powder for plasma spraying" Journal of the European Ceramic Society, lsevier Science Publishers, col. 18 No. 14, pp. 2095-2100.

Zhou Eet al. "Metastable phase formation in plasma-sprayed ZrO(2) (Y(2)0(3))-Al(2)0(3)" Journal of the American Ceramic Society, vol. 86 No. 8, 2003. pp. 1415-1420 XP055268464.

International Search Report and Written Opinion PCT/US2016/019445 dated Jul. 21, 2016.

* cited by examiner

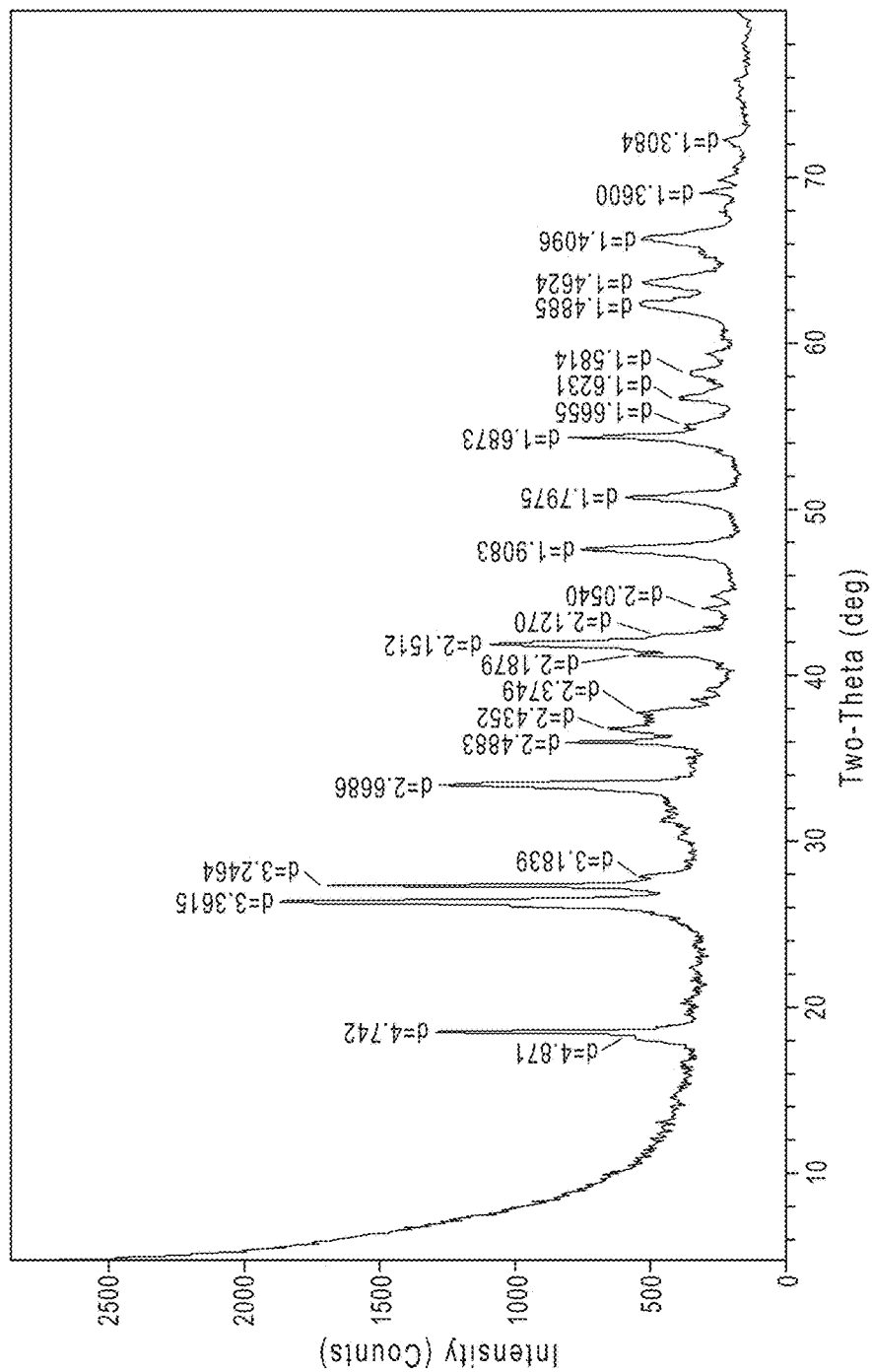

CERAMIC COMPOSITE BEADS AND METHODS FOR MAKING SAME

FIELD OF THE DISCLOSURE

The present disclosure relates generally to methods for processing ceramics from batch materials, and more particularly to the formation of ceramics and glass-ceramics by plasma melting spray-dried batch materials followed by post-treatment, for example, annealing, ceramming, or crystallizing processes.

BACKGROUND

Ceramic bodies are useful in a wide variety of applications including, for example, filtration of diesel and gasoline engine exhaust, and other applications, such as membrane separations and flow-through catalytic converters. By way of non-limiting example, ceramic honeycomb structures or bodies may be selectively plugged and used as diesel particulate filters (DPFs) and gasoline particulate filters (GPFs). Exhaust gas flows into open inlet channels of the DPF or GPF, through the porous wall of the honeycomb (because the inlet channels are plugged at the other end) and out of the outlet channels (which are plugged at the inlet end). During exhaust gas passage through the porous honeycomb wall, small particulates from the exhaust gas can be deposited on the pore surface or as a soot layer on the wall surface, thus providing filtering of the exhaust gas. The soot cake of deposited particulates may be periodically burned off in a regeneration cycle or continuously during passive regeneration such that the lifetime of the DPF or GPF matches that of the vehicle.

Tightening of exhaust gas regulations may call for higher particulate filtration efficiency, particularly for small particles, and for higher NOx filtration efficiency, not only in currently established test cycles, but also in continuous real-world application. Moreover, the desire for filters with lower pressure drop, improved thermal shock resistance, and extended lifespan may necessitate new ceramics with higher porosity, larger pore size, and thinner honeycomb walls. For instance, DPFs and GPFs should have high filtration efficiency for emitted particles and high porosity to allow gas flow through the walls without restricting engine power, while at the same time demonstrating low back pressure. The filters should also be able to withstand the erosive and corrosive exhaust environment and bear thermal shock during rapid heating and cooling.

Ceramics can be formed by reactive sintering of raw materials via a sequence of solid and/or liquid state reactions with various intermediate products. Such sintering reactions tend to yield ceramics with wide grain size distributions and, in the case of multi-phase ceramics, inhomogeneity in the microstructure, including the distribution of the main phase, minor phase, and intergranular and triple point pocket glasses. Microstructural inhomogeneity can affect ceramic properties, such as thermo-mechanical properties. For instance, cordierite and aluminum titanate ceramic bodies may exhibit anisotropy in their thermal expansion with different crystallographic directions exhibiting positive and negative expansion. Due to the anisotropy in thermal expansion, mismatch strains can build up between grains with different crystallographic orientation and such strains can lead to microcracking which, in turn, can lead to decreased material strength and fracture toughness. Thus, observed ceramic material performance is often far below the theoretical performance predicted based on single crystal phase behavior.

Increased microstructural homogeneity can be improved using glass-ceramic methods, in which raw materials are first heated to form a glass melt, which is then cooled into a glass that is subsequently cerammed in an annealing step during which it crystallizes and forms a glass-ceramic. The crystallite sizes and fractions of the resulting glass-ceramics can depend on, e.g., glass composition and annealing conditions, such as temperature, time, environment, cycles, applied stress, and temperature gradient, to name a few. Ideally, a glass-ceramic can comprise a fully or mostly crystallized material (e.g., a ceramic showing only some residual glass in grain boundaries and/or triple junctions).

While glass-ceramics may exhibit relatively higher microstructural homogeneity as compared to ceramics produced by reaction sintering, current glass-ceramic processes may be limited from a compositional standpoint due, for instance, to temperature limitations. To melt the raw materials in the first step of the process, the melt is typically brought to a temperature about 100° C. in excess of the melting point of the composition. Thus, it can be difficult to melt mixtures having a glass transition temperature ($T_g$) greater than about 1500-1600° C. Because of these limitations, it is currently difficult, if not impossible, to generate glass-ceramics from certain raw materials, particularly batch materials with a higher $T_g$.

Accordingly, it would be advantageous to provide methods for forming glass-ceramics with improved microstructural homogeneity, larger grain size, higher porosity, and/or larger pore size without strongly promoting or completely suppressing microcracking or sacrificing other properties such as material strength and/or fracture toughness. Moreover, it would be desirable to provide glass-ceramic methods suitable for processing unconventional raw materials, e.g., materials with a high $T_g$. The resulting glass-ceramics can have improved homogeneity and thus improved strength, while also exhibiting increased porosity and/or increased pore size.

SUMMARY

The disclosure relates, in various embodiments, to methods for making a ceramic or glass-ceramic, the methods comprising spray-drying a mixture comprising batch materials to form agglomerated particles; bringing the agglomerated particles into contact with a plasma for a residence time sufficient to form fused particles; and annealing the fused particles at a temperature and for a time sufficient to form ceramic or glass-ceramic particles. In certain embodiments, the agglomerated particles can be heated to a temperature ranging from about 300° C. to about 3000° C., such as at least about 2000° C., for a residence time of less than about 10 seconds, such as less than about 5 seconds or less than about 1 second. According to further embodiments, the fused particles can be annealed at a temperature ranging from about 700° C. to about 1650° C. for a time period ranging from about 1 hour to about 30 hours. The batch materials can, in certain embodiments, have a $T_g$ of greater than about 1600° C. Ceramic articles, such as ceramic honeycombs, made by these methods are also disclosed herein. In some embodiments, a green article can be formed from the fused particles and subsequently annealed to form a glass-ceramic article.

Fused glass particles and ceramic or glass-ceramic particles are also disclosed herein. Certain embodiments relate to substantially homogeneous ceramic or glass-ceramic particles having an average particle size ranging from about 10 microns to about 50 microns and comprising less than about 5% residual glass phase. The ceramic or glass-ceramic particles can be made by annealing the fused glass particles disclosed herein. The fused glass particles can be substantially homogeneous, can have an average particle size ranging from about 10 microns to about 50 microns and a $T_g$ of at least about 1600° C., and can comprise less than about 5% crystalline phase. Ceramic or glass-ceramic articles, such as honeycombs, made from these fused glass particle are also disclosed herein. The ceramic or glass-ceramic article can, in certain embodiments have a porosity of at least about 40%, a CTE of less than about $20 \times 10^{-7}$ $K^{-1}$ at 20° C. to 800° C., and/or a desirable degree of microcracking, such as a microcrack factor ranging from about 0.1 to about 8. In further embodiments, the ceramic or glass-ceramic article can comprise less than about 5% residual glass phase.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

BRIEF DESCRIPTION OF THE DRAWINGS

The following detailed description can be best understood when read in conjunction with the following drawings, where like structures are indicated with like reference numerals and in which:

FIG. 13A-B are XRD patterns for fused particles after annealing according to additional embodiments of the disclosure;

DETAILED DESCRIPTION

Materials

Figure 1:
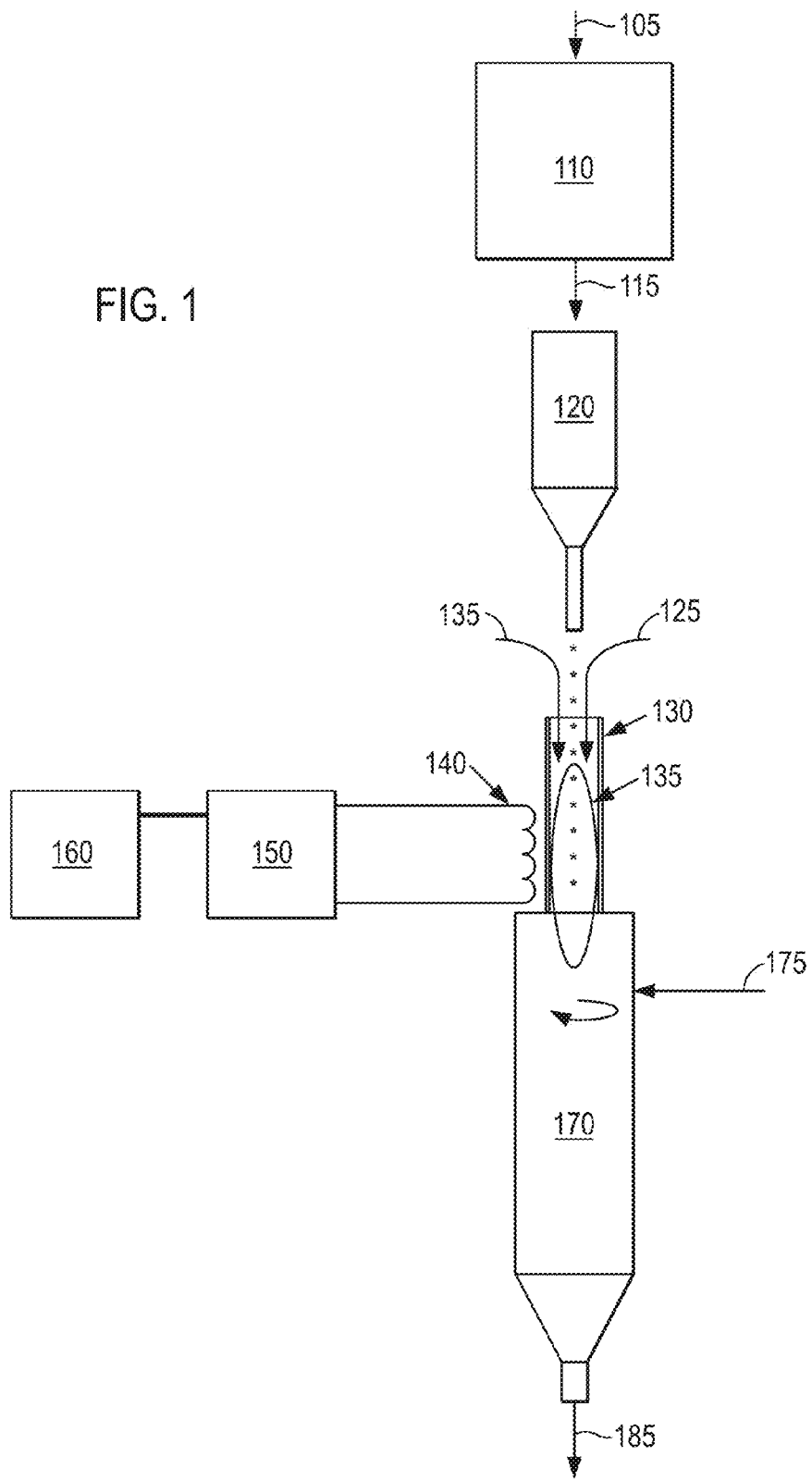
FIG. 1 is a schematic illustration of a system for plasma melting agglomerated particles according to one embodiment of the disclosure.

The term "batch materials" and variations thereof are used herein to denote a mixture of precursor particles which, upon melting, react and/or combine to form fused particles of precursor glass and subsequently, upon annealing, crystallize fully or partially to form a ceramic or glass-ceramic. The batch materials may be prepared and/or mixed by any known method for combining the precursor particles. For example, in certain non-limiting embodiments, the batch materials comprise a mixture of precursor particles, e.g., a slurry of precursor particles mixed with a liquid or solvent. The solids loading of the slurry can vary as appropriate for a given application and can be, for example, up to about 30 vol %, up to about 25 vol %, up to about 20 vol %, up to about 15 vol %, up to about 10 vol %, or up to about 5 vol % solids, including all ranges and subranges therebetween.

Suitable solvents may include, for example, water, alcohols, polar and nonpolar organic solvents, and combinations thereof. The slurry may further comprise other components such as binders, dispersants or surfactants, and anti-foam agents. Binders may be used, for instance, to hold the agglomerated particles of the individual components together after spray-drying and/or to add strength to the agglomerated particles. Non-limiting examples of binders include, for example, acrylic-based binders such as styrene acrylic copolymers (e.g., Duramax™ B-1022 from Rohm-Haas (DOW)); polyethylene glycol (PEG) binders, for example, products from by Carbowax, Union Carbide Corp.; polyvinyl alcohols (e.g., Dolapix from Zschimmer & Schwarz); carboxy-methyl cellulose (CMC) derivatives or other cellulose-like binders; ethylene acrylic acid dispersions (e.g., 4983R from Michelman); and combinations thereof. In certain embodiments, co-binders may be used to increase the green strength of the spray-dried agglomerates. Dispersants or surfactants can be used to coat the particles, change the surface charge, and/or provide steric hindrance to help minimize agglomeration in the slurry before spray-drying. Suitable dispersants or surfactants can include, for example, ammonium salts of acrylic polymers (e.g., Duramax D-3005 from Rohm-Haas (DOW)); polycarboxylate ether (PCE), such as products available from Fritz-Pak Corporation, Darvan C from R. T. Vanderbilt Co.; citric salts, Calgon; and combinations thereof. In certain embodiments, anti-foam agents can be chosen from active silicon polymer emulsions (e.g., Antifoam A from Dow Corning); HS-Defoamer VF 100 from San Nopco; pH-shifting complex salts; anti-foam products from Sigma Aldrich; and combinations thereof.

The batch materials may be prepared by any method known in the art for mixing and/or processing batch materials. For instance, the batch materials may be mixed, milled, ground, and/or otherwise processed to produce a desired mixture with a desired size and/or shape. For example, the batch materials may have an average particle size of less than about 10 microns, for instance, less than about 9, 8, 7, 6, 5, 4, 3, 2, or 1 microns, including all ranges and subranges therebetween. According to various embodiments, the batch materials may comprise typical glass precursor materials, such as silica, alumina, and various additional oxides, such as boron, magnesium, calcium, sodium, potassium, strontium, tin, or titanium oxides, and uncommon glass precursor materials, such as high-melting point precursor materials. For instance, the batch materials may be a mixture of silica and/or alumina with one or more additional oxides. In various embodiments, the batch materials comprise from about 45 to about 95 wt % collectively of alumina and/or silica and from about 5 to about 55 wt % collectively of at least one oxide of barium, boron, magnesium, calcium, sodium, strontium, tin, and/or titanium.

By way of non-limiting example, the batch materials may comprise less than 65, 60, 55, 50, 45, 40, 35, 30, 25, 20, 15, 10, or 5 wt % of aluminum oxide, including all ranges and subranges therebetween. In some embodiments, the batch materials may comprise less than 55, 50, 45, 40, 35, 30, 25, 20, 15, 10, 5, or 2 wt % of silica oxide, including all ranges and subranges therebetween. Alternatively, the batch materials may comprise less than 55, 50, 45, 40, 35, 30, 25, 20, 15, 10, or 5 wt % of magnesium oxide, including all ranges and subranges therebetween. In other embodiments, the batch materials may comprise less than 55, 50, 45, 40, 35, 30, 25, 20, 15, 10, or 5 wt % of calcium oxide, including all ranges and subranges therebetween. For instance, the batch materials may comprise less than 10, 5, 2, or 1 wt % of cerium oxide, including all ranges and subranges therebetween, or 0 wt % cerium oxide. According to further embodiments, the batch materials may comprise less than 5, 2, 1, or 0.5 wt % of sodium oxide, including all ranges and subranges therebetween, or 0% sodium oxide. In yet further embodiments, the batch materials may comprise less than 30, 25, 20, 15, 10, or 5 wt % of strontium oxide, including all ranges and subranges therebetween, or 0 wt % strontium oxide. In still further embodiments, the batch materials may comprise less than 55, 50, 45, 40, 35, 30, 25, 20, 15, 10, or 5 wt % of tin oxide, including all ranges and subranges therebetween. According to other embodiments, the batch materials may comprise less than 55, 50, 45, 40, 35, 30, 25, 20, 15, 10, or 5 wt % of titanium oxide, including all ranges and subranges therebetween. It is to be understood that various mixtures of oxides described above may be used, with the total amount of the at least one oxide being less than about 55 wt %.

The silica and/or alumina may be present in a combined amount of at least about 45 wt % of the batch materials, for instance, at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, or at least about 95 wt %. According to certain embodiments, the batch materials may comprise at least about 3, 5, 7, 10, 15, 20, 25, 30, 35, 40, 45, 50, 55, 60, 65, 70, 75, 80, 85, 90, or 95 wt % of silica. In other embodiments, the batch materials may comprise at least about 30, 35, 40, 45, 50, 55, 60, 65, 70, 75, 80, 85, 90, or 95 wt % of alumina. It is to be understood that mixtures of silica and alumina in the amounts indicated above may also be used, with the combined amount of silica and alumina being greater than about 45 wt %.

It is also envisioned that additional batch compositions which may require elevated melting temperatures and/or which may have other processing difficulties similar to those described above can be used as batch materials to be processed according to the methods described herein. For instance, batch compositions comprising silicon nitride, silicon carbide, zirconia, and other oxides with high melting temperature may be suitable for processing according to the methods described herein. For example, the methods disclosed herein can be used to process compositions having a $T_g$ greater than about 1500° C., such as greater than about 1550° C., 1600° C., 1650° C., 1700° C., 1750° C., 1800° C., 1850° C., 1900° C., 1950° C., or 2000° C., including all ranges and subranges therebetween.

In certain embodiments, the batch materials and their amounts may be chosen as appropriate to form ceramic materials such as cordierite, aluminum titanate, spinel, mullite, zirconium nitride, and composites thereof, such as cordierite-aluminum titanate-mullite, spinel-aluminum titanate, mullite-aluminum titanate, alumina-aluminum titanate, ZrN-SiAlON, ZrN—SiON, and TiC—Ti-cordierite, to name a few. For example, batch materials may include fine oxide powders such as $Al_2O_3$, MgO, $TiO_2$, $SiO_2$, $CeO_2$, and the like. Fine alumina may have an average particle size of less than about 3 microns, such as A152SG from Almatis, or less than about 1 micron, such as A1000 from Almatis. Fine titania may have an average particle size of less than about 1 micron, such as R101 from Dupont. Fine magnesia may have an average particle size of less than about 10 microns, such as Magchem 10 from Martin-Marietta, or less than about 1 micron, such as MagChem 20 from Martin-Marietta. Fine ceria may have an average particle size of less than about 1 micron or less than about 0.8 microns, such as cerium IV oxide from MinMetals, Inc., Mollycorps, and Sigma Aldrich. Fine silica may haven an average particle size of less than about 1 micron, such as Ludox HS-40 (suspension of 40% colloidal silica) from Sigma Aldrich.

Non-oxide batch materials can also be used, such as nitrides or carbides, or mixtures thereof with oxides to obtain, for example, mixed nitride/oxide, nitride/nitride, nitride/carbide, mixed carbide/oxide, pure nitride, or pure carbide structures. Non-limiting exemplary non-oxide batch materials can include, for instance, carbides, nitrides, and borides, e.g., TaN, ZrN, SiC, TiC, and NbC, to name a few. Mixtures of refractory oxides, nitrides, or carbides with metals can also be used to obtain, for example, metal-oxides, metal-nitrides, metal-carbides, and so on. Of course other inorganic batch materials can also be used to form additional ceramics and ceramic composites using the methods disclosed herein, these batch materials and ceramics also falling within the scope of the disclosure. Ceramics and glass-ceramics produced according to the instant disclosure can have high strength, thermal conductivity, electrical conductivity, and/or special magnetic properties.

Methods

Disclosed herein are methods for making a ceramic or glass-ceramic, the methods comprising spray-drying a mixture comprising batch materials to form agglomerated particles, bringing the agglomerated particles into contact with a plasma for a residence time sufficient to melt or fuse the agglomerated particles, and annealing the fused particles to form ceramic or glass-ceramic particles. Also disclosed herein are methods for making a ceramic or glass-ceramic article, comprising forming the fused particles into a green article and annealing the green article to form a ceramic or glass-ceramic article. Further disclosed herein are methods for making a ceramic or glass-ceramic article, comprising forming the ceramic or glass-ceramic particles into a ceramic or glass-ceramic article.

According to various embodiments, fine batch materials (e.g., $d_{50}$<10 microns) such as oxide powders or suspensions may be combined with at least one solvent, organic binder, dispersant, surfactant, and/or anti-foam agent to create a slurry. The slurry can then be spray-dried to create substantially homogeneous agglomerated particles or agglomerates. As used herein, the terms "spray-dried particles," "agglomerated particles," "spray-dried agglomerates," "agglomerates" and variations thereof are used interchangeably to refer to the particles obtained after spray-drying the batch materials.

Before spray-drying, the individual components or powders in the batch materials may or may not be pre-dried to remove any moisture from the hygroscopic components, e.g., in an oven, hot air dryer, or other suitable device for a time period ranging from about 1 hours to about 12 hours, such as from about 2 hours to about 10 hours, or from about 5 hours to about 8 hours, and at a temperature ranging from about 50° C. to about 150° C., such as from about 80° C. to about 120° C., or from about 90° C. to about 100° C., including all ranges and subranges therebetween. In certain embodiments, the batch materials, alone or as a mixture, can be further processed with additional steps such as sieving, compounding, and further drying, which may reduce clogging of the nozzle and/or settling of larger particles in the slurry or feed tube. Mixtures of batch materials can be made by weighing the individual constituents, combining them, and then optionally further mixing them with media, e.g., in a Turbula® mixer with alumina media, to break up any remaining agglomerates.

To create a slurry, the liquid components (e.g., solvents, binders, dispersants, surfactants, anti-foam agents, etc.) may be separately combined, the solid components (e.g., inorganic powders) may be separately combined, and the pre-mixed solids can be slowly added to the pre-mixed liquids, or vice versa. Of course, other mixing orders can be used, such as creating separate slurries of different liquids and solids and mixing the slurries together, and so on, without limitation.

The slurry can then be introduced, e.g., pumped, into a spray dryer, such as a fluid nozzle or atomizer nozzle spray dryer, where it is suspended in a carrier gas. The nozzle size of the spray dryer may vary as desired for a particular application, as well as other processing parameters such as inlet temperature, pressure, solid loading, etc. In non-limiting embodiments, the nozzle outlet may have a diameter ranging from about 0.5 mm to about 5 mm, such as from about 1 mm to about 3 mm, for example, about 1.5 mm, 2.0 mm, or 2.6 mm, including all ranges and subranges therebetween. Exemplary spray dryers include, for instance, GEA Mobile Minor laboratory or GEA Production Minor spray dryers with 2-fluid nozzle or rotary atomizer (allowing for particle size selection via nozzle rotation speed). Exemplary spray-drying methods and parameters are disclosed in U.S. Provisional Application No. 61/825,251 and International Patent Application No. PCT/US2014/038050 (published as WO2014/189741), assigned to Applicant, which are incorporated herein by reference in their entireties.

The nozzle rotation speed is inversely proportional to the spray-dried particle size and can be varied to produce agglomerated particles of different sizes. For example, the nozzle rotation speed can be as high as about 30,000 rpm, such as ranging from about 15,000 to about 30,000 rpm, such as from about 18,000 to about 25,000 rpm, or from about 20,000 to about 22,000 rpm, including all ranges and subranges therebetween, to produce agglomerated particle having an average particle size ranging from about 10 microns to about 50 microns, such as from about 15 microns to about 40 microns, from about 20 microns to about 35 microns, or from about 25 microns to about 30 microns, including all ranges and subranges therebetween. In certain embodiments, the agglomerated particles may have an average particle size ranging from about 18.6 microns to about 39.5 microns. The spray dryer can employ a carrier gas, for example, air, oxygen, and inert gases such as nitrogen, helium, and argon, to name a few. The temperature of the spray dryer gas can vary depending on the particular application and can, in some embodiments, be less than or equal to about 400° C., such as from about 100° C. to about 350° C., from about 150° C. to about 300° C., or from about 200° C. to about 250° C., including all ranges and subranges therebetween.

The agglomerated particles thus produced can then be contacted with a plasma for a period of time sufficient to at least partially melt the agglomerated particles to produce fused particles, e.g., glass compositions. As used herein, the terms "contact" and "contacted" and variations thereof are intended to denote the physical and/or thermal interaction of the agglomerated particles with the plasma. For instance, the agglomerated particles may be physically introduced into the plasma and/or may come into thermal contact with the plasma, e.g., the heat produced by the plasma. As used herein, the terms "plasma," "thermal plasma," "atmospheric plasma," and variations thereof are intended to denote a gas (e.g., argon) that passes through an incident high frequency electric field. Encountering the electromagnetic field produces ionization of the gas atoms and frees electrons which are accelerated to a high velocity and, thus, a high kinetic energy. Some of the high velocity electrons ionize other atoms by colliding with their outermost electrons and those freed electrons can in turn produce additional ionization, resulting in a cascading ionization effect. The plasma thus produced can flow in a stream and the energetic particles caught in this stream are projected toward and strike an object to be heated, thereby transferring their kinetic energy to the object (e.g., melting the agglomerated particles).

The agglomerated particles may be introduced into the plasma plume using any means known in the art, such as a batch feeder. For example, the batch feeder may comprise a screw feeder equipped with an auger and/or nozzle which dispenses the batch materials. In certain non-limiting examples, the batch feeder may dispense at least about 1 gram of agglomerated particles per turn of the screw. The agglomerated particles may be dispensed into a sifter canister or similar apparatus, in which any larger spray-dried agglomerates can be precluded from contacting the plasma. The agglomerated particles may, in certain embodiments, flow through the openings in the canister in a dispersion stream to the plasma torch. For example, the agglomerated particles may flow at a rate of at least about 1 gram per minute into the plasma torch, such as, at least about 2 g/min, 3 g/min, 4 g/min, 5 g/min, 10 g/min, 50 g/min, 100 g/min, 250 g/min, and so on. In certain embodiments, the flow rate may range up to about 500 g/min or greater. The sifter canister or batch feeder may also be flooded with an inert gas, such as argon, if desired to prevent the introduction of atmospheric gases into the plasma torch.

The agglomerated particles may be introduced into the plasma plume optionally in the presence of a stream of gas which may, in various embodiments, be chosen from oxygen, purified and dehumidified ambient air, and inert gases such as nitrogen, argon, helium, and mixtures thereof. The agglomerated particles may be entrained in the gas stream such that the particles are floating freely within the stream of gas. The gas stream may be at ambient temperature or it may optionally be heated. The feed rate of the gas stream may range, for example, from about 1 slpm to about 150 slpm, for example, from about 10 slpm to about 125 slpm, from about 15 slpm to about 100 slpm, from about 20 slpm to about 75 slpm, or from about 25 to about 50 slpm, including all ranges and subranges therebetween. It is within the ability of one skilled in the art to select the flow rate appropriate for the desired operation and result.

According to various embodiments, the agglomerated particles are rapidly heated and melted by contact with the plasma plume. The plasma plume may be envisioned as having a substantially cylindrical or slightly conical shape, with a given length and a circular cross-section. The circular cross-section is defined by the center, or core, and various concentric rings or sheaths. The temperature of the plasma plume may thus be described as a cross-sectional gradient, where the core of the plasma plume can have a temperature of at least about 11000K and the outer sheath or outer edge of the plasma plume stream may have a relatively lower temperature of at least about 300K. For instance, the core may have a temperature ranging from about 9000K to about 11000K and the outer sheath may have a temperature ranging from about 300K to about 1000K, such as from about 300K to about 500K. The plasma plume may be generated using various heating methods, for example, dielectric (RF) field ionization and direct current (DC) arc methods, and combinations thereof.

The agglomerated particles, upon introduction into the plasma plume, may flow in any direction, such as a substantially vertical direction, e.g., dropping along the length of the plasma plume, or they may flow in a cyclonic pattern along the length of the plume. By way of non-limiting example, a second stream of gas may be introduced into the plasma vessel, in a direction tangential to the flow of the plasma plume. The angle of introduction may vary depending on the apparatus, but may generally range from about 15° to about 90°, relative to the flow of the plasma, e.g., relative to the flow along the length of the plasma plume. The cyclonic flow within the plume serves not only to lengthen the residence time of the agglomerated particles in the plasma but also generates a centrifugal force which can drive the agglomerated particles to the cooler outer edges of the plasma plume in such applications where lower melting temperatures are desired. Once the agglomerated particles achieve the desired level of melting, either the gravitational force and/or the cyclonic action, together with the velocity of the plasma plume, may drive the particles out of the plasma plume and into a collection chamber.

The agglomerated particles may contact the plasma for a residence time sufficient to partially or fully melt and/or react the particles. As used herein, the term "react" and "reaction" and variations thereof are intended to denote the interactions of the various phases in the agglomerated particles during heating including, but not limited to, combustion of organic and inorganic materials, evaporation of water, compound formation, and melting reactions. According to various embodiments, the residence time within the plasma plume may be less than about 10 seconds, for instance, less than about 5 seconds, less than about 1 second, less than about 0.5 seconds, or less than about 0.1 seconds. In other embodiments, the rapid heating of the batch materials may occur within milliseconds, for example, the time period may range from about 0.01 to about 0.09 seconds. According to various embodiments, the residence time of the agglomerated particles in the plasma plume may be increased by employing more than one run, e.g., by reintroducing the agglomerated particles into the plasma plume two or more times, such as three or more, four or more, five or more, ten or more, and so on, until the desired degree of melting is achieved. In certain non-limiting embodiments, the plasma plume heats the agglomerated particles to a temperature ranging, for example, from about 300° C. to about 3000° C., such as from about 500° C. to about 2500° C., from about 800° C. to about 2000° C., or from about 1000° C. to about 1500° C., including all ranges and subranges therebetween. According to various embodiments, the agglomerated particles are heated to a temperature of at least about 2000° C. In further embodiments, after a sufficient residence time in contact with the plasma plume, the fused particles may be collected and optionally further processed. For instance, the fused particles may be collected and cooled or quenched at various cooling rates.

Without wishing to be bound by theory, in at least certain embodiments, it is believed that the use of a plasma plume will rapidly heat the agglomerated particles such that they transform into substantially homogeneous fused particles.

The rapid heating allows the individual components in the agglomerated particles to fuse into an unstable amorphous glassy state far from thermodynamic equilibrium. The thermodynamic imbalance may drive new microstructures in the resulting glass-ceramics during an annealing stage. Further, the ability to rapidly cool the fused particles upon exiting the plasma may prevent or substantially prevent crystallization within the fused particles, such that the fused particles are predominantly or totally amorphous with very little or no crystalline phases (e.g., less than about 5%). For example, the fused particles may comprise less than about 10%, 9%, 8%, 7%, 6%, 5%, 4%, 3%, 2%, 1%, 0.5%, 0.2%, or 0.1% of crystalline phase(s), including all ranges and subranges therebetween. The ability to rapidly cool the particles after fusing may be particularly beneficial for making unconventional materials from compositions that tend to crystallize upon slow cooling.

According to embodiments disclosed herein, the fused particles can be annealed to form ceramic or glass-ceramic particles. Alternatively, the fused particles can be formed into a green article which can then be annealed to form a ceramic or glass-ceramic article. For example, the fused particles can be extruded (e.g., in the presence of a binder, plasticizer, and/or pore former), calendared, rolled, pressed, hot pressed, cast, or tape cast to create a green article of the desired shape and size. The fused particles or green article may be heat-treated according to a ceramming schedule suitable to form a ceramic or glass-ceramic.

Ceramming schedules are known in the art and may vary depending on the properties of the precursor glass and/or the desired properties of the glass-ceramic. It is within the ability of one skilled in the art to control the necessary processing parameters (e.g., ramp rate, temperature, time) as necessary for a particular application. According to various embodiments, the fused particles or green article may be heated to a temperature ranging from about 700° C. to about 1650° C. and for a time ranging from about 1 hour to about 24 hours. For example, the annealing temperature can be at least about 700° C., 750° C., 800° C., 850° C., 900° C., 1000° C., 1050° C., 1100° C., 1150° C., 1200° C., 1250° C., 1300° C., 1350° C., 1400° C., 1450° C., 1500° C., 1550° C., 1600° C., or 1650° C., including all ranges and subranges therebetween. The annealing time can be at least about 1 hour, 2 hours, 3 hours, 4 hours, 6 hours, 8 hours, 10 hours, 12 hours, 14 hours, 16 hours, 18 hours, 20 hours, 22 hours, 24 hours, 30 hours, 36 hours, 48 hours, 60 hours, 72 hours, 84 hours, 96 hours, 100 hours, 200 hours, 300 hours, 400 hours, or 500 hours or more, including all ranges and subranges therebetween.

In some embodiments, the fused particles or green article may be cerammed in a one-step, two-step, or multi-step process. One step processes can include heating the fused particles or green article to a first temperature using a first ramp rate, and holding at that temperature for a period of time sufficient to form a glass-ceramic. The first temperature can be any annealing temperature disclosed herein, for example, at least about 800° C., at least about 1000° C., at least about 1300° C., and so on. Likewise, the annealing time can be any residence time disclosed herein, such as at least about 1 hour, at least about 4 hours, at least about 8 hours, and so forth. Furthermore, ramp rates up to and/or down from the first temperature can vary depending on the desired application and can range, for instance, from about 1° C./min to about 150° C./min, such as from about 10° C./min to about 100° C./min, or from about 20° C./min to about 50° C./min, including all ranges and subranges therebetween. In certain embodiments, the ramp rate can range from about 1° C./min to about 10° C./min, such as from about 2° C./min to about 9° C./min, from about 3° C./min to about 8° C./min, from about 4° C./min to about 7° C./min, or from about 5° C./min to about 6° C./min, including all ranges and subranges therebetween.

A two-step process can involve a nucleation step, wherein crystals in the fused particles begin to form, and a growth step, wherein the crystals grow and form phases in the particles. By way of non-limiting example, the nucleation step may comprise heating a furnace to a first temperature ranging from about 700° C. to about 900° C., such as from about 750° C. to about 850° C. (or any other annealing temperature disclosed herein), at a ramp rate as set forth above, and holding the furnace at the first temperature for a time ranging from about 1 to about 30 hours, such as from about 1 to about 4 hours or from about 8 to 12 hours, including all ranges and subranges therebetween. The growth step may, in certain embodiments, comprise heating the furnace to a second temperature ranging from about 900° C. to about 1650° C., such as from about 1000° C. to about 1300° C. (or any other annealing temperature disclosed herein), at a ramp rate as set forth above, and holding the furnace at the second temperature for a time ranging from about 1 to about 30 hours, such as from about 2 to about 16 hours or from about 4 to 12 hours, including all ranges and subranges therebetween.

Other ceramming schedules are known in the art and may be used in accordance with the disclosure to convert the fused particles or green article into a glass-ceramic. For example, various combinations of temperatures and hold times, e.g., three or more stages, etc., may be employed to obtain a glass-ceramic with desired properties. It is within the ability of one skilled in the art to vary the annealing parameters as appropriate for a given application or to obtain a desired property.

Apparatus

FIG. 1 illustrates an exemplary system operable for carrying out a method according to the present disclosure. In this embodiment, agglomerated particles 105 are introduced into a batch feeder and/or mixer 110, where they can be mixed and optionally fed into a sifter 120, which can, e.g., exclude larger particles. The sifted agglomerated particles 115 (the flow of which is also illustrated by the * symbol) are then introduced into the plasma containment vessel 130. The sifted agglomerated particles 115 may be entrained in the plasma gas 125, which is also introduced into the plasma containment vessel 130. In certain embodiments, the plasma containment vessel 130 may comprise an interior region, comprising the plasma plume 135, and an exterior region, which may comprise a shield gas 145 for purposes of cooling the walls of the interior region. An RF coil 140 is disposed around the plasma containment vessel 130 and is attached to an RF plasma generator 160 by way of an RF plasma matchwork 150. The RF plasma generator 160 serves to convert the plasma gas 125 into a plasma plume 135. The sifted agglomerated particles 115 are introduced into the plasma containment vessel 130 at the center of the plasma plume 135, where they are heated to form fused particles 185. The fused particles 185 are then collected in a collection vessel 170. A tangential flow of gas 175 may be used to cool the fused particles 185 and/or to induce a cyclonic flow within the collection vessel 170. After collection, the fused particles 185 may be subjected to additional, optional processing steps.

Plasma melting methods and apparatuses are described, for example, in International Patent Application No. PCT/US14/57977, assigned to Applicant, which is incorporated herein by reference in its entirety. The apparatuses described herein may employ, in various embodiments, a plasma plume produced by RF inductively coupled plasma (ICP). In other embodiments, the plasma plume may be produced by a combination of RF ICP and DC non-transferrable arc plasma, also referred to as "hybrid plasma." RF induction typically provides a large volume of plasma, but the plasma may be highly turbulent. The DC arc plasma, on the other hand, tends to be more stable, having a substantially cylindrical/conical shape, but has a relatively small volume. Without wishing to be bound by theory, it is believed that the DC arc plasma may serve to stabilize the RF plasma and provide it with a substantially cylindrical cone shaped plume, while still maintaining a high volume of plasma.

An RF induction coil is disposed around the plasma containment vessel and connected to an RF matchwork for impedance matching and an RF generator. The RF generator may produce power at a frequency ranging from about 400 kHz to about 5.8 GHz. For instance, RF frequencies include 6.78 MHz, 13.56 MHz, 27.12 MHz, and 40.68 MHz, and microwave frequencies include 2.441 GHz and 5.800 GHz. For lower frequencies in the kHz range, a high frequency (>1 MHz) excitation may first be used, followed by the use of low frequency to maintain and operate the plasma. The RF generator power level may range from about 1 kW to about 1 MW, depending on the operation cost and throughput requirements. For example, the power level may range from about 4.6 kW to about 500 kW, from about 60 kW to about 300 kW, or from about 100 kW to about 200 kW, including all ranges and subranges therebetween.

The plasma containment vessel is advantageously constructed out of a corrosion-resistant material, such as a high temperature ceramic material with high dielectric strength. The containment vessel may, in certain embodiments, comprise concentric interior and exterior chambers. Surrounding the interior chamber, the exterior chamber may comprise an annulus of shield gas jets, which may be used for cooling the walls of the interior chamber. The shield gas jets may also provide additional plasma gas components to increase the plasma temperature, such as helium, argon, oxygen, or nitrogen.

In other embodiments, to increase residence time, an additional induction coil may be utilized to extend the length of the plasma. In such instances, the additional coil may be wrapped around the plasma containment vessel, which is coupled to an induction heating generator. The generator may operate at lower frequencies, such as less than 1 MHz, for example, 450 kHz, and a power rating ranging from about 10 kW to about 100 kW. Additional tangential inlets for the second gas may be included in the plasma delivery vessel to keep the cyclonic flow going down the length of the plasma plume.

The plasma containment vessel may have any shape or dimension and, in certain instances, may be tubular in shape. The plasma delivery vessel may advantageously be constructed of a durable material, such as 316 stainless steel or silicon nitride $S_3N_4$. A water cooling jacket may be disposed around the outside of the plasma containment vessel, which may serve to keep the boundary region between the plasma plume outer edges and the vessel at a lower temperature. The containment vessel may also be fitted with a guide tube, which may be used to introduce the agglomerated particles into the plasma plume. For instance, the guide tube may be constructed of durable, heat-resistant materials such as platinum and rhodium, such as an 80/20 mixture of platinum and rhodium, or silicon nitride $S_3N_4$.

The RF coil disposed around the plasma containment vessel may, in certain embodiments, be constructed of copper optionally plated with silver. The induction coil may, in various embodiments, wrap around the vessel at least about 3 times, for example, at least about 4 times. Cooling water may flow through the coil to reduce the amount of heat the coil may absorb from the containment vessel. The RF current flowing in the coil produced a magnetic field perpendicular to the turns of the coil, with the field lines concentrating inside the plasma containment tube. This magnetic field reverses and collapses rapidly to produce a current flowing in a continuous circular path or short circuit. For instance, the magnetic field may collapse approximately every 74 nanoseconds (corresponding to a frequency of 13.56 MHz), about every 37 nanoseconds (corresponding to a frequency of 27.12 MHz), about every 25 nanoseconds (corresponding to a frequency of 40.68 MHz), about or every 17 nanoseconds (corresponding to a frequency of about 60 MHz), and so on. The current flow superheats the gas inside the plasma containment tube into plasma.

The plasma may be ignited according to any means known in the art. For example, an electrode may be passed into the collection vessel via a pneumatic slide and charged with high voltage (e.g., about 100 kV) from a spark coil. The high voltage may produce a corona which conducts upward to the plasma collection vessel. The heat from the spark can then be used to ignite the plasma. The plasma plume may have any directional orientation but, in certain embodiments, may be a vertical plasma plume, as illustrated in FIG. 1. The core of the plasma can reach up to about 11,000K, whereas the outer edge of the plasma can be as low as 300K. The plasma plume may be at atmospheric pressure, in which case it may be characterized as an atmospheric pressure thermal plasma jet.

The agglomerated particles may be fluidized by combining them with the plasma gas, e.g., the particles are entrained in the first gas. This stream may then be fed into the plasma containment vessel, where the first gas is converted into a plasma and the agglomerated particles are delivered into the center of the plasma plume. In certain non-limiting embodiments, a second gas may be injected into the plasma containment vessel, with a relatively high velocity in a direction tangential to the plasma plume, which produces a cyclonic flow around the plasma. The plasma and glass particles are twisted into a cyclonic pattern. Due to centrifugal force, which may be directly proportional to the second gas flow velocity, the particles may be pushed to the outer edge of the plasma plume where temperatures are relatively lower. The flow velocity of the second gas may vary, depending on the desired throughput and may, in certain embodiments, range from about 10 slpm to about 200 slpm, for example, from about 30 slpm to about 150 slpm, or from about 50 slpm to about 100 slpm, including all ranges and subranges therebetween.

If desired, the cyclonic action can be used to avoid long residence times for the agglomerated particles in or near the higher temperature core where the particles could potentially vaporize. Additionally, the cyclone can drive the fused particles out of the plume and into a collection vessel, such as a hermetically sealed collection chamber. For instance, a fine mesh may be used to collect the fused particles. The fused particles may accumulate on the mesh for a period of collection, after which the mesh is shaken and/or blasted with inert gas to move the fused particles into the collection vessel. Any gas in the collection chamber can optionally be separated, filtered, and returned back to the beginning of the process.

Alternatively, the fused particles may flow into the collection vessel and may, in certain embodiments, be contacted with a tangential flow of a third gas. The tangential flow in the collection vessel may serve to induce a cyclonic flow pattern, which may promote cooling of the fused particles as they travel in the vessel and before they come to rest. The flow velocity of the third gas may vary depending on the desired cooling rate and, in certain embodiments, can range from about 10 slpm to about 100 slpm, for example, from about 15 slpm to about 50 slpm, or from about 20 slpm to about 30 slpm, including all ranges and subranges therebetween.

The apparatus described herein may be operated under tightly contained conditions, which may provide for a product with a high degree of purity. In addition, the rapid thermal transfer achieved by using a plasma can dramatically reduce residence times for melting, thereby increasing throughput. Moreover, the plasma technology operates at a relatively low cost and is not prone to mechanical failures, thus decreasing down time and operational costs. Furthermore, the plasma technology provides a continuous process for melting the agglomerated materials, as opposed to the traditionally slower batch processes.

Particles

It will be appreciated that the inorganic chemical composition of the agglomerated particles will be the same or substantially similar to the inorganic chemical composition of the (dehydrated, decarboxylated, denitrated, etc.) batch materials, e.g., having the same elemental ratio, and likewise the resulting fused and ceramic or glass-ceramic particles will also have substantially the same chemical composition or elemental ratios. It is therefore within the scope of the present disclosure that the agglomerated particles, fused particles, and ceramic or glass-ceramic particles have elemental compositions as described above with reference to the makeup of the batch materials.

The agglomerated particles can comprise batch materials and optional additives such as binders, dispersants, etc. The agglomerated particles may be more homogeneous than a solid mixture comprising typical batch materials, e.g., an extrusion paste of batch materials. As used herein, the terms "homogeneity," "substantial homogeneity," and variations thereof with reference to agglomerated particles are intended to denote that the agglomerated particle has a relatively constant distribution of mixed batch materials across a given length scale. Pockets of individual components may still exist within the agglomerated particles, but these pockets may be substantially finer (smaller) as compared to the distribution of the dry mixture or extruded paste.

The agglomerated particles may have a substantially spheroidal shape. As used herein, the terms "spheroidal," "substantially spheroidal," and variations thereof are intended to denote a shape which is substantially spherical, ellipsoidal, toroidal (torus-like with or without a center hole), or globular, although it is understood that the agglomerated particles may have minor imperfections which prevent them from being perfectly spheroid in shape. It is also understood that each agglomerate particle may vary in shape or size from the next particle, with an average particle size ranging from about d10 to about 50 microns, such as from about 15 to about 40 microns, from about 20 to about 35 microns, or from about 25 to about 30 microns, including all ranges and subranges therebetween.

After the agglomerated particles contact the plasma, fused particles with improved chemical homogeneity may be formed as compared to the agglomerated particles. The fused particles may be substantially homogeneous, substantially spheroidal in shape, substantially amorphous, and/or may have a substantially smooth surface. The fused particles may be substantially independent or separate particles which have been heated to a temperature sufficient to react and/or melt the batch material components into a substantially chemically homogenous fused particle. The mass and size of the fused particles may be similar to that of the agglomerated particles introduced into the plasma.

As used herein the terms "homogeneity," "substantial homogeneity" and variations thereof with reference to fused particles and glass-ceramic particles are intended to denote that the particles exhibit physical and/or chemical homogeneity across a length scale approximately equal to its diameter. For instance, for an exemplary particle having an average particle size of 50 microns, the particle is substantially homogeneous across a length scale approximately equal to 50 microns. Likewise, particles having average particle sizes ranging from about 10 to about 50 microns may be homogeneous across a length scale ranging from about 10 to about 50 microns.

As used herein, the terms "amorphous," "substantially amorphous," and variations thereof are intended to denote fused particles comprising little or no crystalline phases. Pockets of crystalline phases may exist within the amorphous fused particle, but these pockets may make up a relatively small percentage of the particle. In some embodiments, the fused particles may be fully amorphous, e.g., not crystallized. In other embodiments, the fused particles may be substantially amorphous, e.g., comprising minor amounts of one or more crystalline phases, such as less than about 5%, less than about 4%, less than about 3%, less than about 2%, less than about 1%, less than about 0.5%, less than about 0.2%, or less than about 0.1% of crystalline phase, including all ranges and subranges therebetween. As used herein, the terms "smooth," "substantially smooth," and variations thereof are intended to denote a substantially even or regular surface which is substantially free of projections or indentations, such as jagged edges, sharp points, and/or lumps.

During annealing, the substantially amorphous fused particles may be converted to substantially crystalline ceramic or glass-ceramic particles. Like the fused particles, the ceramic or glass-ceramic particles may be substantially spheroidal in shape and may exhibit homogeneous phase distribution throughout the particle. As used herein, the terms "crystalline," "substantially crystalline" and variations thereof are intended to denote that the ceramic or glass-ceramic particles comprise little or no residual glass phase, e.g., glass at the intergranular boundary. In some embodiments, the particles may be fully crystalline, e.g., comprising no residual glass. In other embodiments, the glass-ceramic particles may be substantially crystalline, e.g., comprising minor amounts of a glass phase, such as less than about 5%, less than about 4%, less than about 3%, less than about 2%, less than about 1%, less than about 0.5%, less than about 0.2%, or less than about 0.1%, including all ranges and subranges therebetween. The mass and size of the glass-ceramic particles may be similar to that of the fused particles before annealing.

The terms "glass-ceramic" and "ceramic" are used interchangeably herein to refer to the particles and articles produced after annealing the fused particles (or green bodies formed from the fused particles). The term "glass-ceramic" implies ceramics, ceramics with intergranular glass, and glass-ceramic composites obtained by the glass-ceramic method, e.g., first melting or fusing the batch materials and then annealing the precursor glass to obtain the ceramic.

Articles

According to embodiments disclosed herein, the fused particles can be formed into a green article which can then be annealed to form a glass-ceramic article. For example, the fused particles can be extruded (e.g., in the presence of a binder, plasticizer, and/or pore former), calendared, rolled, pressed, hot pressed, cast, or tape cast to create a green article of the desired shape and size. As such, the fused particles can be used to form green membranes, solid or porous bodies, extruded honeycombs, and the like. Exemplary honeycombs may have any cell geometry, for example, 300 cells per square inch (cpsi) (46.5 cells per square cm) and 14 mil (0.014 inch or 0.0356 cm) wall thickness (300/14), (400/14), (600/9), (900/12), or any other cell geometry suitable for the desired application, e.g., suitable for use as a honeycomb substrate or filter. Green articles such as honeycombs and the like can be optionally dried, for example, in a microwave oven, air dried, hot air dried, RF dried, etc., or subjected to a combination of drying methods and times until sufficiently dried to the desired level before firing.

Thus, exemplary embodiments of the disclosure provide higher porosity and larger pore size porous ceramic articles by use of fused particles compared to standard powdered raw materials. In some embodiments, porosity equal to or greater than about 40%, 45%, 50%, 55%, 60%, or even above 65% can be achieved with median pore sizes ranging from about 10 to about 30 microns, such as from about 15 microns to about 20 microns. Agglomerated particles with a narrow particle size distribution (PSD) may be melted to form fused particles also having a narrow PSD. The larger the particles and the more homogeneous in size, the larger the porosity and pore size in the porous ceramic article. As such methods disclosed herein can avoid or limit broad particle size distributions and/or broad pore size distributions, which could otherwise negatively impact porous ceramic article properties such as material strength.

Using fused particles with a narrow PSD as the starting material for forming the green articles can produce a natural low density packing with a narrow pore size distribution. Using fused particles that are substantially homogeneous can yield a glass-ceramic article with a very fine microstructure, such as an interwoven dendritic structure, which can improve the fracture toughness of the article. Moreover, improved homogeneity can reduce strain between different crystal grains within the article, thus reducing microcracking in the article and increasing material strength.

According to exemplary embodiments of the disclosure, highly permeable, highly porous glass-ceramic articles can be prepared using methods disclosed herein. For example, the glass-ceramic article can have a permeability greater than about 1000 and a porosity greater than about 50%. In various embodiments, permeability can be greater than about 1100, 1200, 1300, 1400, 1500, or greater, and porosity can be greater than about 55%, 60%, 65%, 70%, or greater. According to other embodiments, the porous glass-ceramic article can have a median pore size ($d_{50}$) greater than 10 microns, such as greater than about 11, 12, 13, 14, 15, 16, 17, 18, 19, or 20 microns. In additional embodiments, the glass-ceramic article can have a coefficient of thermal expansion (CTE) at room temperature (about 20° C.) to 800° C. of less than about $20 \times 10^{-7}$ $K^{-1}$, for example, less than about $15 \times 10^{-7}$ $K^{-1}$, or less than about $10 \times 10^{-7}$ $K^{-1}$. Furthermore, the glass-ceramic article, such as a (300/14) honeycomb, can have a modulus of rupture (MOR) flexural strength of greater than about 170 psi, such as greater than about 200 psi. Non-limiting embodiments of the disclosure relate to glass-ceramic articles with a low degree of microcracking. For example, in some embodiments, the ceramic or glass-ceramic can have a degree of microcracking less than about 9, such as ranging from about 0.1 to about 8, from about 0.3 to about 7, from about 0.5 to about 6, from about 0.7 to about 5, or from about 3 to about 4, including all ranges and subranges therebetween. Cordierite ceramics can, for example, have a microcrack factor ranging from about 0.2 to about 0.7, whereas aluminum-titanate ceramics can have a microrack factor ranging from about 3 to about 8.

It will be appreciated that the various disclosed embodiments may involve particular features, elements or steps that are described in connection with that particular embodiment. It will further be appreciated that a particular feature, element or step, although described in relation to one particular embodiment, may be interchanged or combined with alternate embodiments in various non-illustrated combinations or permutations.

It is to be understood that, as used herein the terms "the," "a," or "an," mean "at least one," and should not be limited to "only one" unless explicitly indicated to the contrary. Thus, for example, reference to "a particle" includes examples having two or more such "particles" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Various ranges are expressed herein as "greater than about" one or more particular values or "less than about" one or more particular values and "all ranges and subranges therebetween." When such ranges are expressed, examples include from any one particular value to any other particular value. For instance, batch materials comprising greater than about 45 wt % of alumina, such as greater than about 50, 55, 60, 65, 70, 75, 80, 85, or 90 wt % include ranges of alumina from about 45 wt % to about 90 wt %, from about 65 wt % to about 80 wt %, and all other possible ranges between each disclosed value. Similarly, batch materials comprising less than about 55 wt % of at least one oxide, such as less than about 50, 45, 40, 35, 30, 25, 20, 15, or 10 wt % include ranges of oxide from about 10 wt % to about 55 wt %, from about 15 wt % to about 40 wt %, and all other possible ranges between each disclosed value.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a temperature greater than 25° C." and "a temperature greater than about 25° C." both include embodiments of "a temperature greater than about 25° C." as well as "a temperature greater than 25° C."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to batch materials that comprise certain elements include embodiments where the batch materials consist of those elements, and embodiments where the batch materials consist essentially of those elements.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The following Examples are intended to be non-restrictive and illustrative only, with the scope of the invention being defined by the claims.

EXAMPLES

Batch Materials

The following compositions A and B were prepared by combining the components listed in the tables below to form a slurry:

Composition A

|  | Function | Amount (wt) |
|---|---|---|
| Dry Ingredients X | | |
| Calcined Alumina A1000 SGD | Oxide | 40.18 |
| Titanium dioxide R101 | Oxide | 50.86 |
| Magnesium oxide Magchem 10 | Oxide | 7.96 |
| Milled Cerium oxide | Oxide | 1.00 |
| | | Total X = 100 |
| Liquid Additions Y | | |
| Colloidal silica Ludox AS-40 | Oxide | 48.40 |
| Deionized water | Solvent | 87.50 |
| Duramax D-3005 | Dispersant | 0.55 |
| Duramax B-1022 | Binder | 5.00 |
| | | Total X + Y = 241.45 |

Composition B

|  | Function | Amount (wt) |
|---|---|---|
| Dry Ingredients X | | |
| Calcined Alumina A1000 SGD | Oxide | 43.04 |
| Titanium dioxide R101 | Oxide | 51.90 |
| Magnesium oxide Magchem 10 | Oxide | 5.05 |
| | | Total X = 100 |

-continued

|  | Function | Amount (wt) |
|---|---|---|
| Liquid Additions Y | | |
| Colloidal silica Ludox AS-40 | Oxide | 5.02 |
| Deionized water | Solvent | 90.50 |
| Duramax D-3005 | Binder | 0.65 |
| Duramax B-1022 | Binder | 5.00 |
| | | Total X + Y = 201.17 |

Composition A comprises alumina, titania, magnesia, silica, and ceria (as a representative rare earth oxide). Composition B comprises lower amounts of silica and does not comprise ceria. The compositions were chosen to correspond to different equilibrium phase mixtures of aluminum titanate, cordierite, and mullite. Upon annealing at high temperature, composition A can result in an equilibrium phase mixture of Mg-substituted aluminum titanate, cordierite, and mullite (>60% aluminum titanate). Composition B can result in an equilibrium phase mixtures of Mg-substituted aluminum titanate and mullite.

Spray-Drying

Figure 2A:
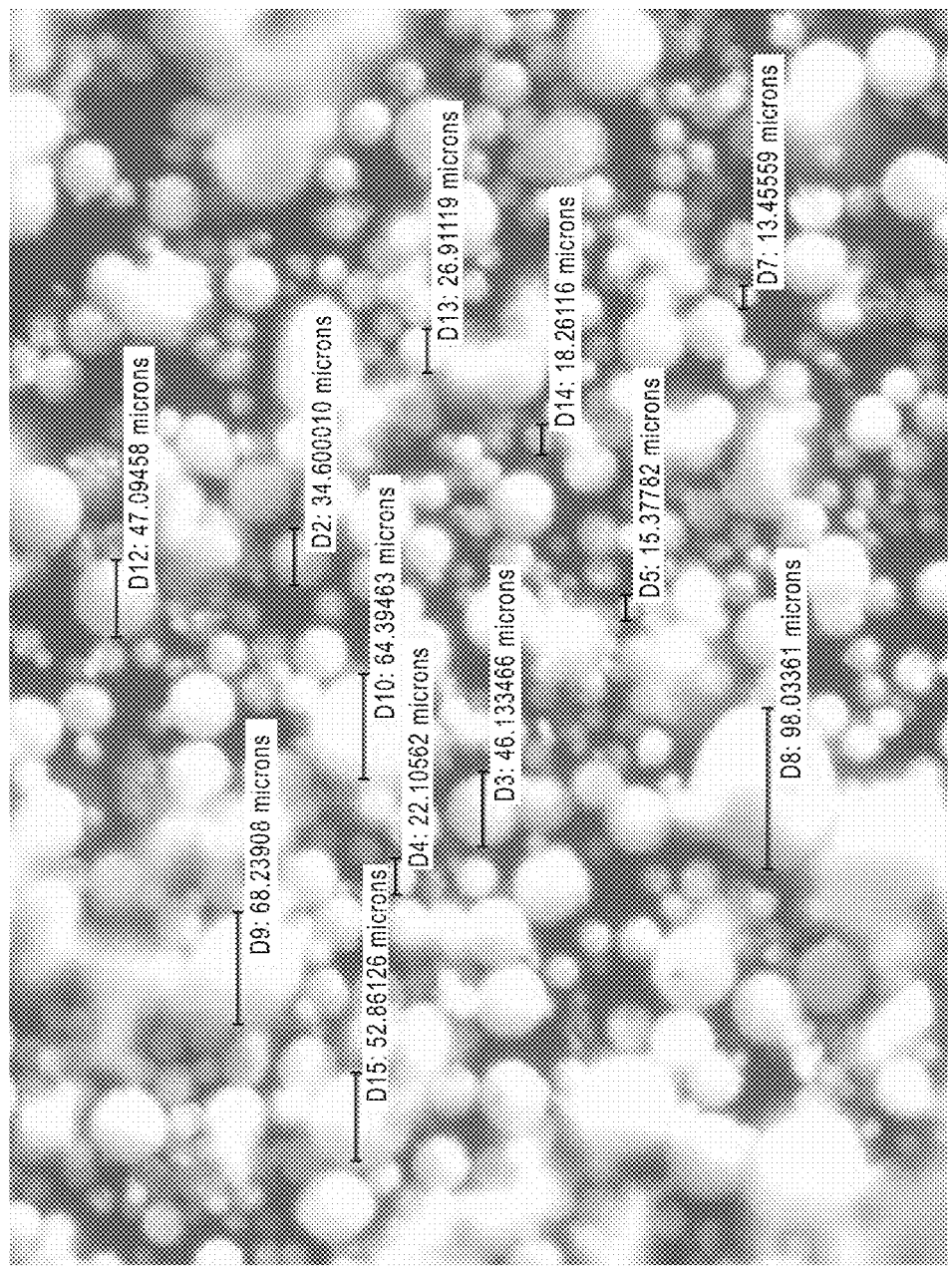
FIG. 2A is an optical microscope image of spray-dried particles according to certain embodiments of the disclosure.
Figure 2B:
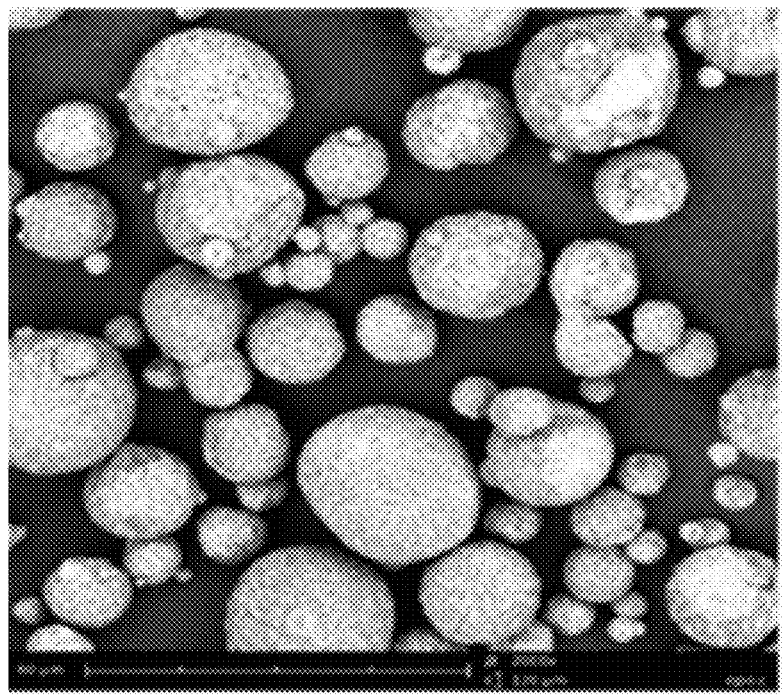
FIG. 2B is an SEM image of the spray-dried particles of FIG. 2A.
Figure 2C:
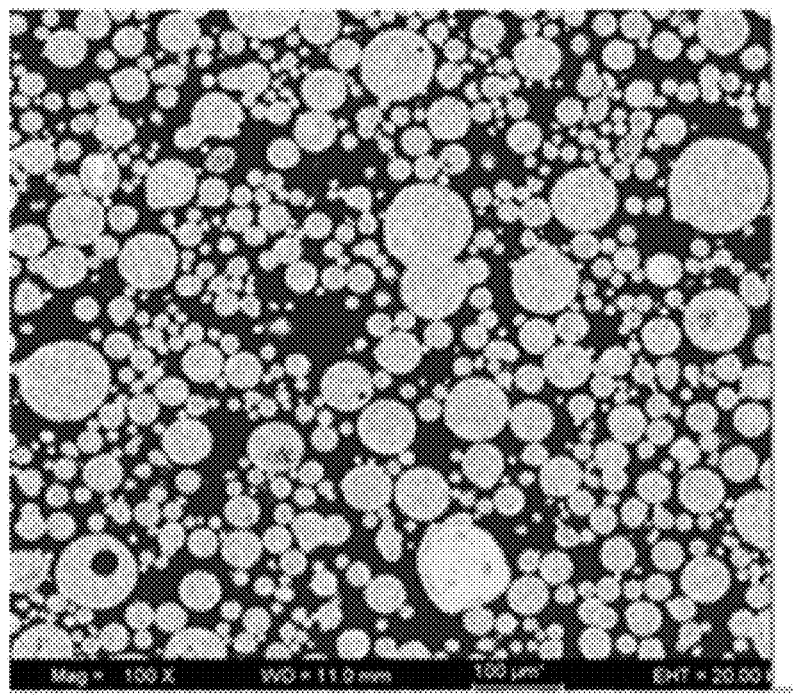
FIG. 2C is an SEM image of a polished cross-section of the spray-dried particles of FIG. 2A embedded in epoxy.
Figure 2D:
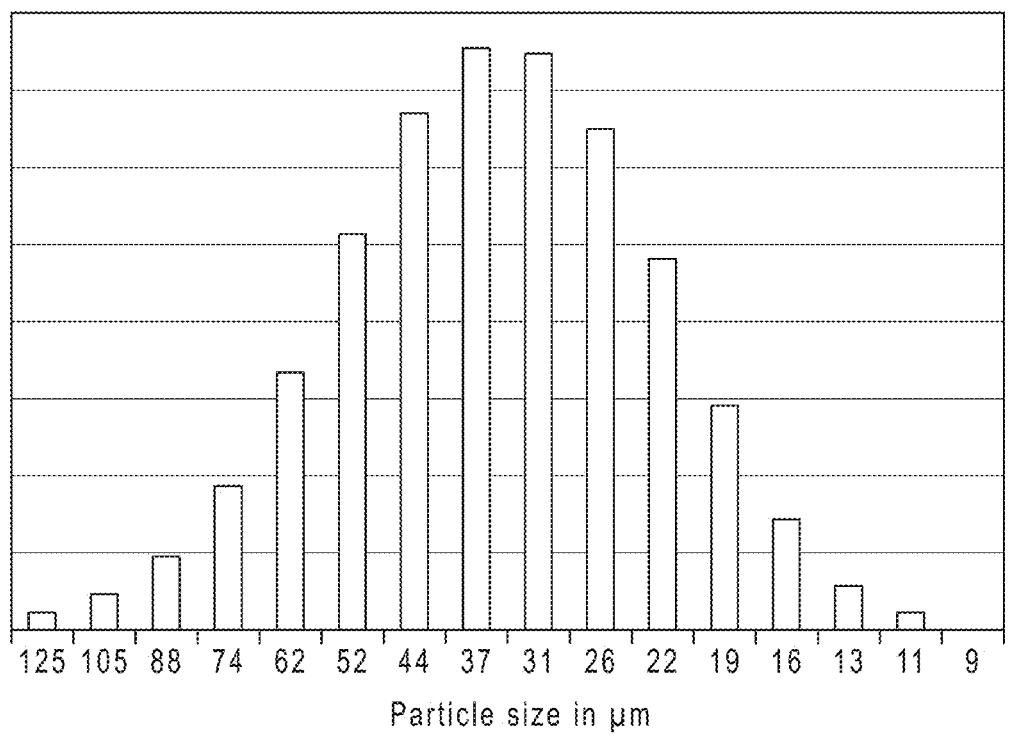
FIG. 2D is a graphical representation of spray-dried particle size distribution according to various embodiments of the disclosure.
Figure 2E:
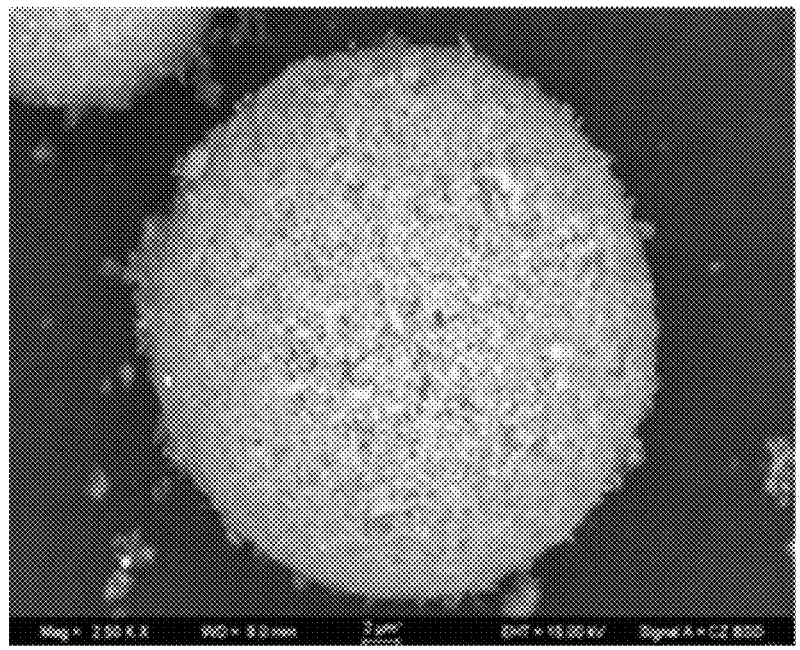
FIG. 2E is an SEM image of the surface of a spray-dried particle according to some embodiments of the disclosure.
Figure 2F:
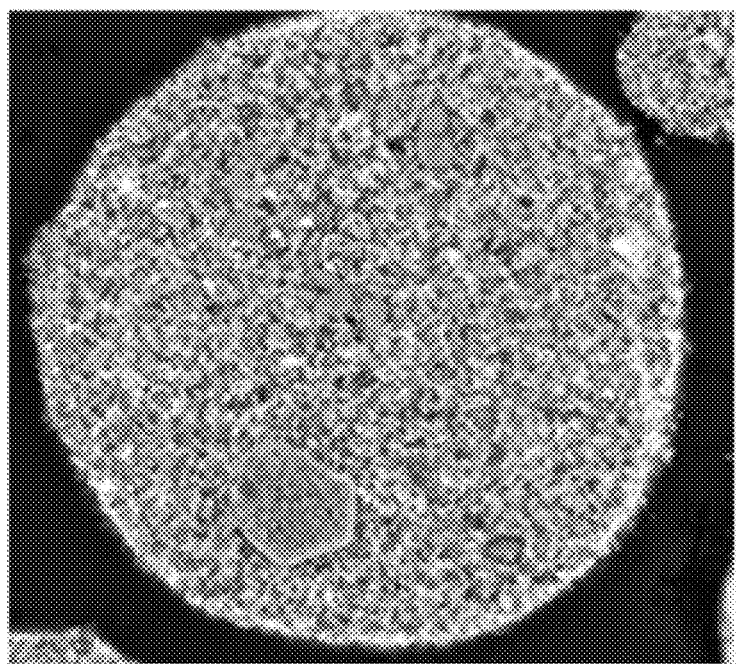
FIG. 2F is an SEM image of a polished cross-section of a spray-dried particle according to other embodiments of the disclosure.
Figure 3A:
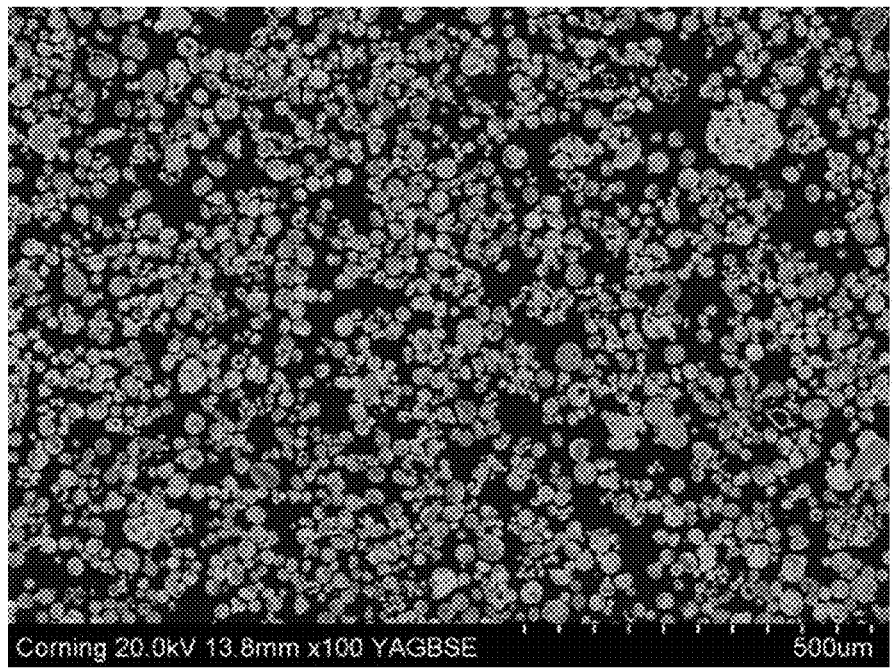
FIGS. 3A-B are SEM images of polished cross-sections of spray-dried particles according to further embodiments of the disclosure.
Figure 3B:
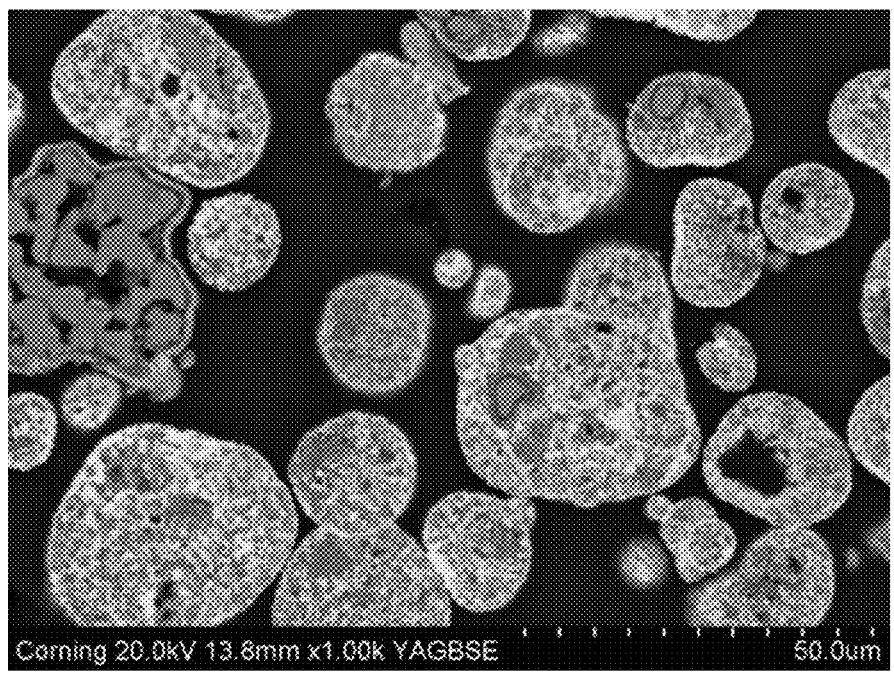
Figure 3C:
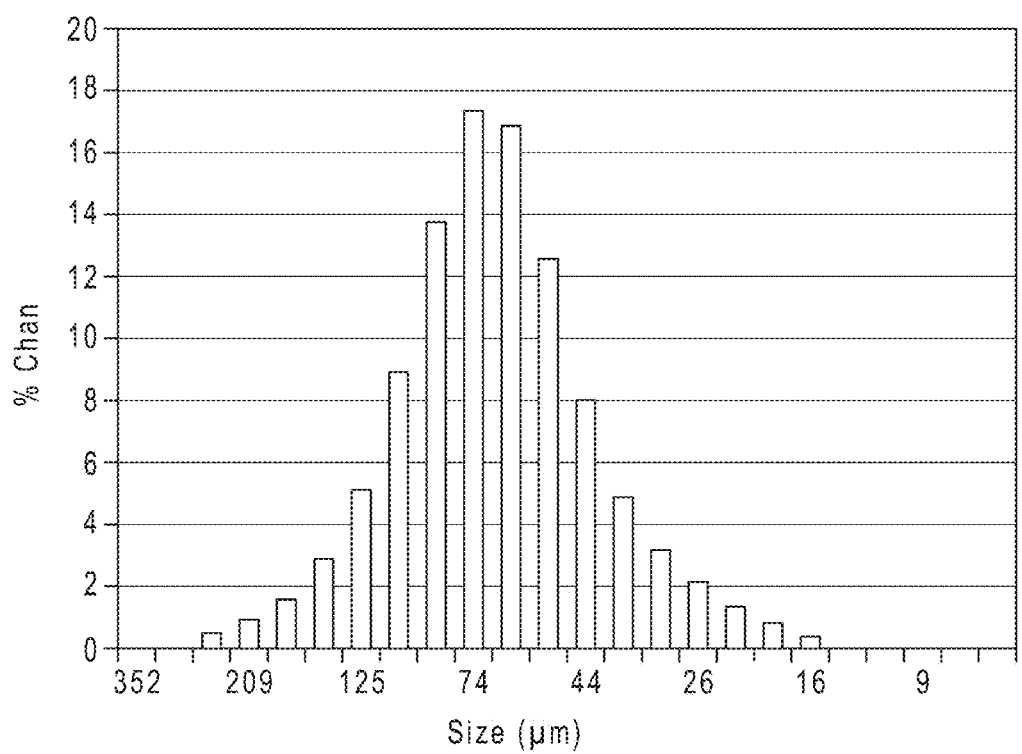
FIG. 3C is a graphical representation of spray-dried particle size distribution according to various embodiments of the disclosure.

Compositions A and B were spray dried with a GEA production Minor spray dryer using a rotary atomizer nozzle with nitrogen as the carrier gas. FIG. 2A is an optical microscope image of the spray-dried powder produced from composition A illustrating the agglomerate particle shape and size distribution. FIG. 2B is a scanning electron microscope (SEM) image of the powder, showing details on the homogeneous raw material phase distribution in the spray-dried agglomerated particles. FIG. 2C is an SEM image of a polished cross-section of the powder embedded in epoxy, illustrating again the high quality of the agglomerated particles in terms of chemical homogeneity and shape. It can also been seen that most particles were solid (a single particle in the image shows hollow nature). FIG. 2D is a graphical illustration of typical particle size distribution obtained by spray-drying composition A. FIG. 2E is an SEM image of the surface of a single spray-dried particle. FIG. 2F is an SEM image of a polished cross-section of a single spray-dried particle illustrating the raw material distribution and packing. FIGS. 3A-B are SEM images of a polished cross-section of the spray-dried powder produced from composition B, embedded in epoxy. FIG. 3C is a graphical illustration of typical particle size distribution obtained by spray-drying composition B. The spray-dried agglomerated particles appear to have very homogeneous starting phase and particle distribution, with only occasional larger magnesia particles creating slight inhomogeneity.

Plasma Melting

Plasma Torch A

Agglomerated particles produced by spray-drying composition A were plasma melted using an atmospheric thermal RF inductively coupled plasma operating at 13.56 MHz and 4.6 kW (with <200 W reflected power) ("plasma torch A"). The RF generator was an MKS Spectrum generator capable of 10 kW and an Advanced Energy 5 kW matching network with auto and manual match controls. The plasma working gas was pure argon delivered at a rate of 16 slpm and the sheath gas was also pure argon run at a flow rate of 24 slpm. The quench gas was purified and dried air at a cyclonic flow rate of 120 slpm. The free electron temperature of the plasma was >7300K and the free electron density was $3.5 \times 10^{21}$ electrons. Ions were cold and not accelerated. The spray-dried particles were fed at a rate of 3-4 g/min into the plasma with an average free fall velocity of 0.85 m/s.

Figure 4:
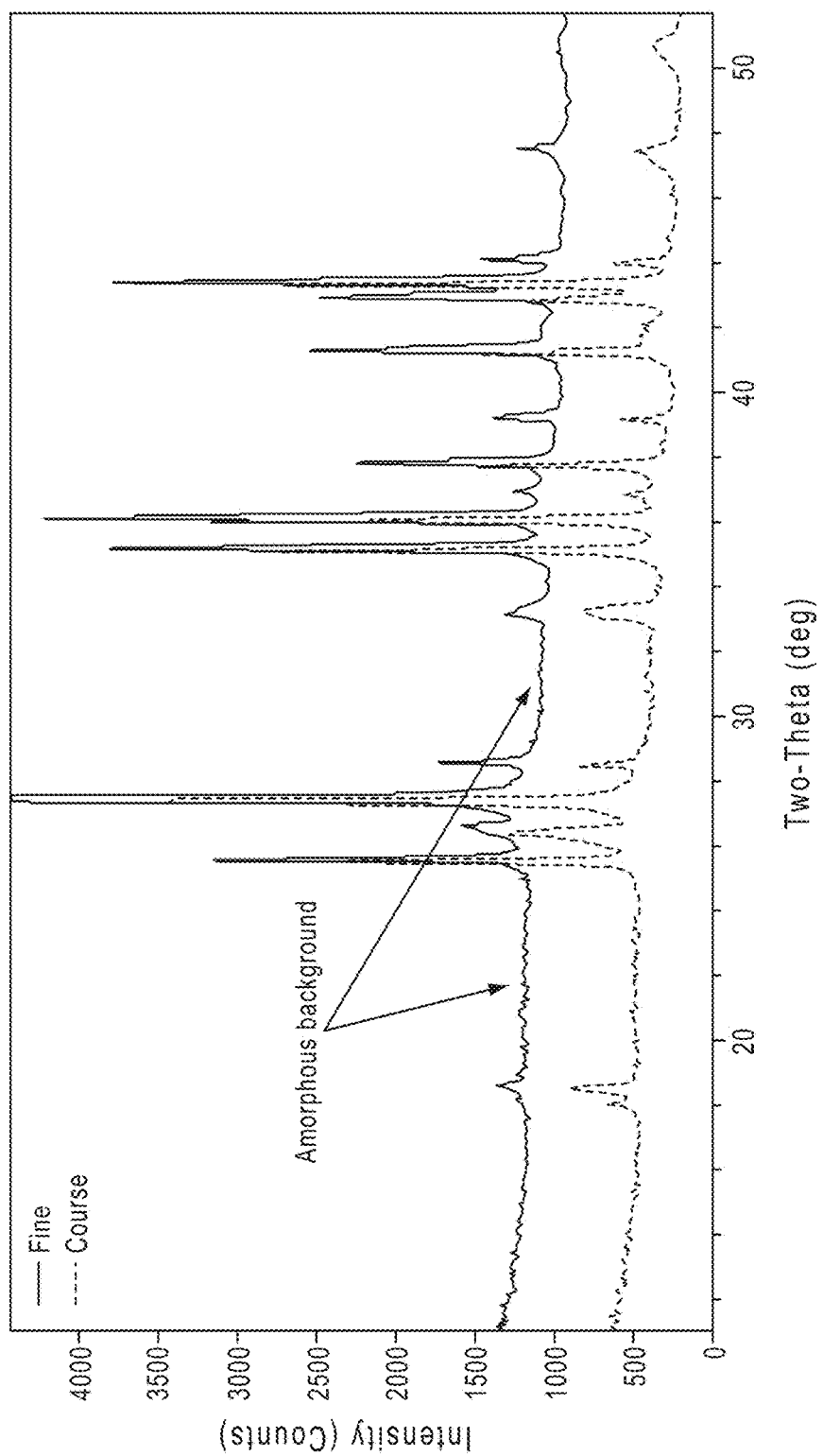
FIG. 4 is an XRD pattern of fused particles after plasma melting according to certain embodiments of the disclosure.

FIG. 4 is an XRD pattern of the resulting glass particles after a single pass. Results are shown for fine (<10 microns) and coarse (20-30 microns) starting powders. The XRD shows that some crystalline aluminum titanate and amorphous phases have formed, but a large amount of unreacted material is still present. Without wishing to be bound by theory, it is believed that the lower power plasma melter has a smaller area of focus such that only particles passing through the central region of the plume are fully melted or fused. Additionally, it is believed that the lower power plasma melter cannot quench the particles as efficiently, which may lead to some crystallization during cooling of the fused particles.

Figure 5A:
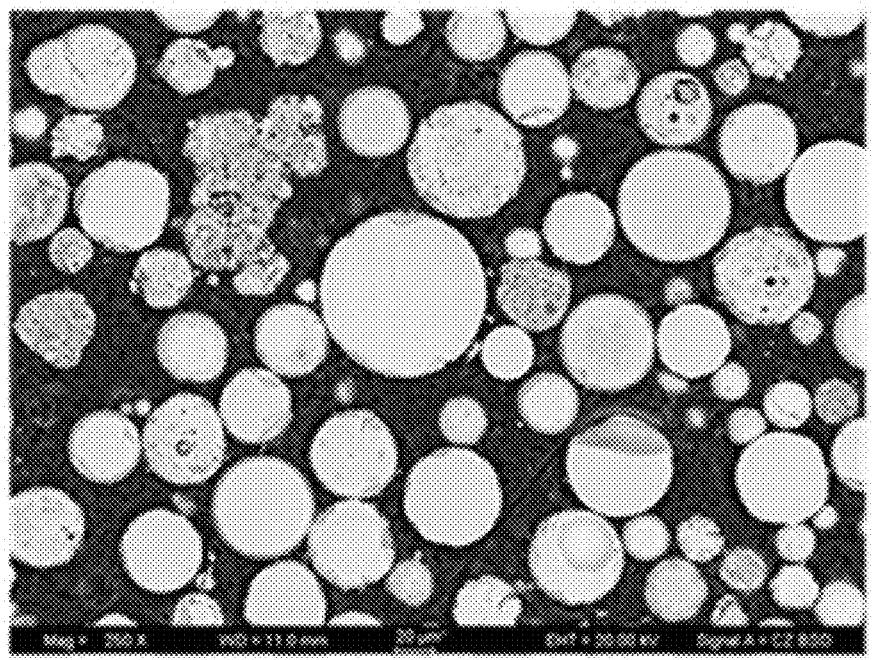
FIG. 5A is an SEM image of a polished cross-section of epoxy-embedded fused particles according to other embodiments of the disclosure.
Figure 5B:
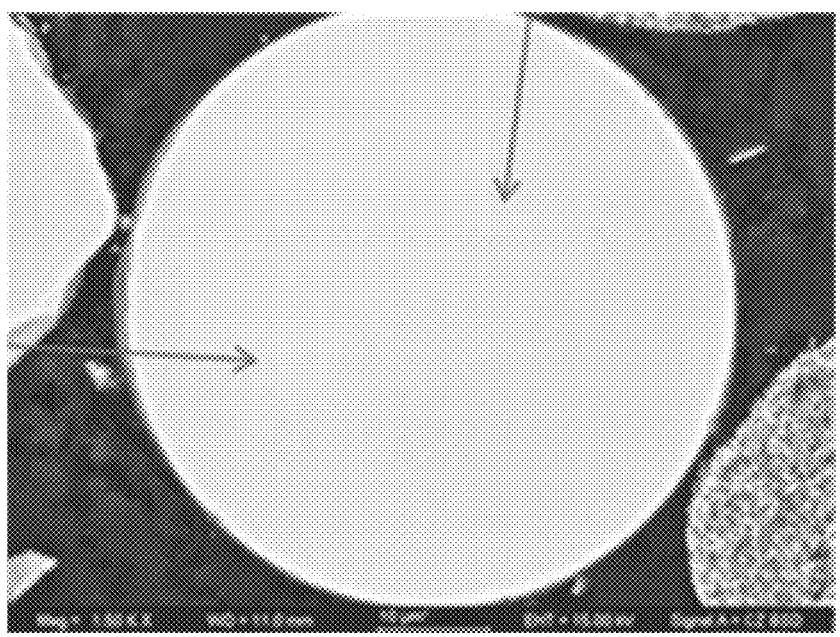
FIG. 5B is a polished cross-section of a fused particle according to additional embodiments of the disclosure.
Figure 5C:
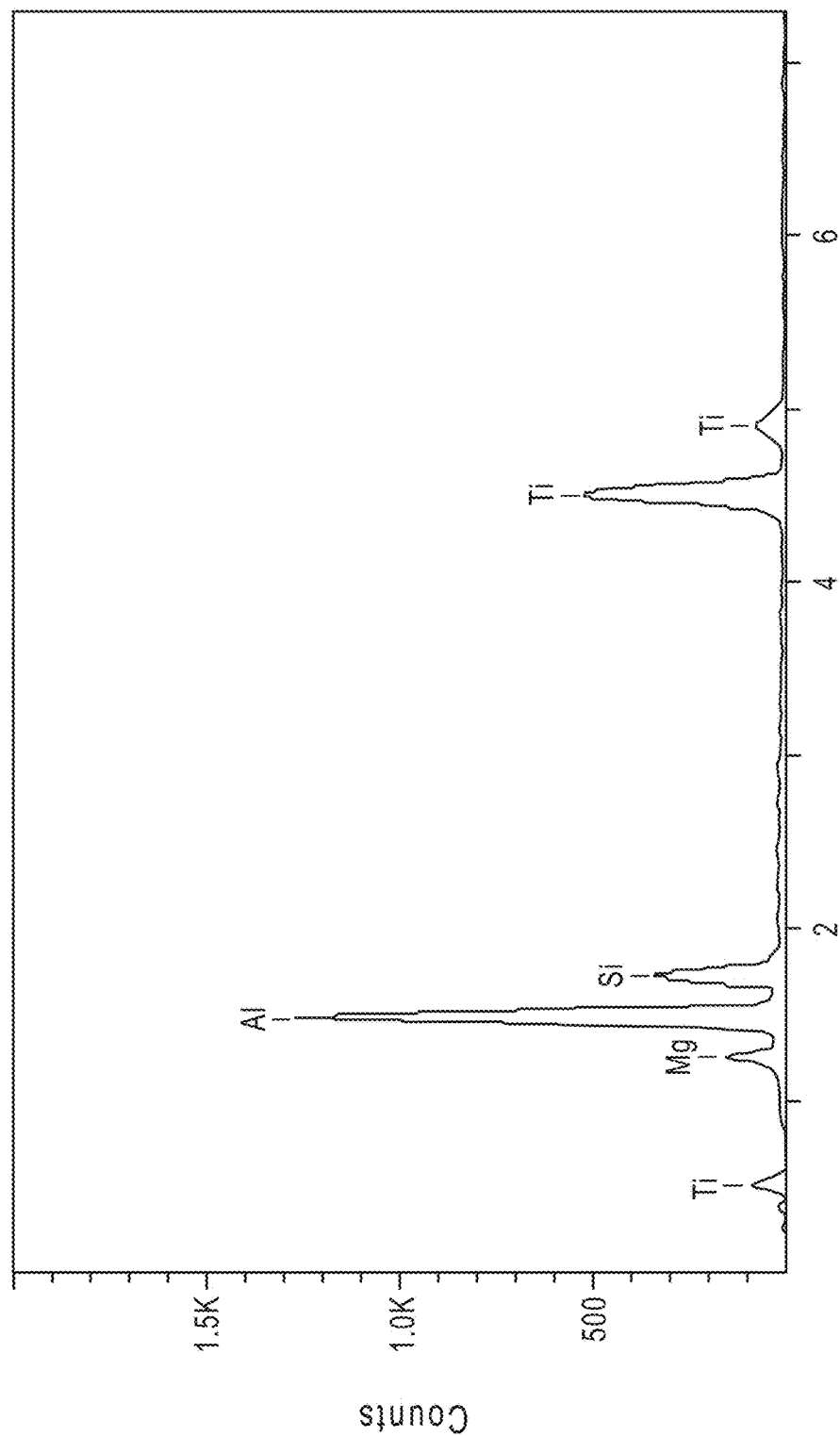
FIG. 5C is an EDX spectrum of a fused particle according to further embodiments of the disclosure.

FIG. 5A is an SEM image of a polished cross-section of epoxy-embedded powder formed from composition A after four consecutive passes through plasma torch A. Compared to the result of a single pass in the low power plasma torch, the fraction of fused amorphous particles has significantly increased. FIG. 5B is a polished cross-section of a single fused particle showing its homogeneity and amorphous nature (by lack of any phase contrast). FIG. 5C is an EDX spectrum of a single fused bead showing that it is a mixed Mg—Ti—Al—Si-oxide glass that matches the initial composition of the agglomerated particle. The additional passes through the plasma (increased residence time) appear to provide enhanced fusion of the agglomerated particles, such that a majority fraction (approximately 80%) of the particles are fused.

Figure 6:
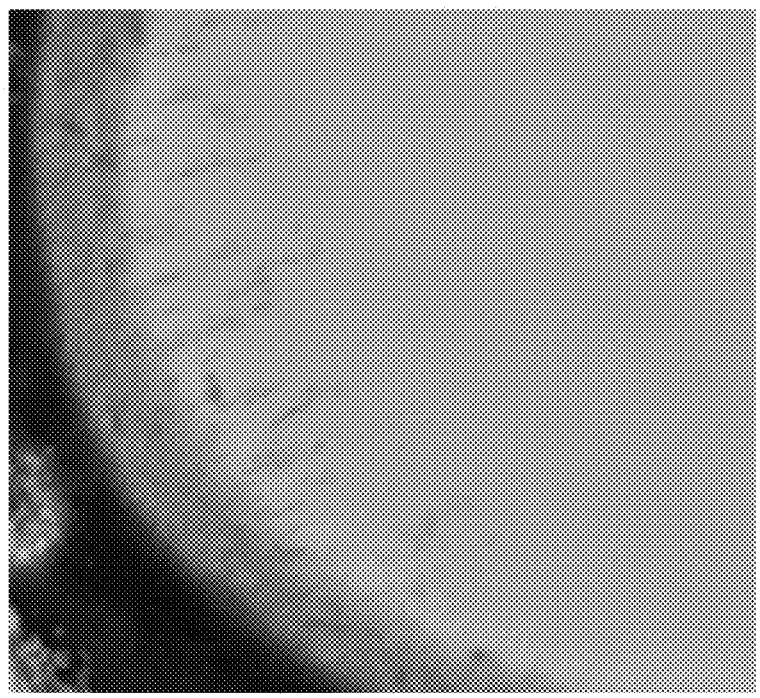
FIG. 6 is an SEM image of a polished cross-section of a fused particle according yet further embodiments of the disclosure.

After an initial pass through the plasma torch, some particles underwent crystallization during additional passes through the plasma torch. This may have occurred when fused amorphous particles did not pass through the high temperature center of the torch during the additional passes and were instead exposed to lower temperatures that may have initiated crystallization. FIG. 6 is an SEM image of a polished cross-section of such a particle of composition A produced by four passes through the low power plasma torch A. The initially fused particle started to crystallize in the subsequent passes and thus demonstrates minor surface-initiated crystallization. The SEM images of the polished cross-section show an overall homogeneous composition in the particle center, a recrystallized shell at the surface and initial demixing stages close to the outer surface. Electron backscatter diffraction (EBSD) did not identify any crystalline phases, only compositional fluctuations in this intermediate area.

Figure 7A:
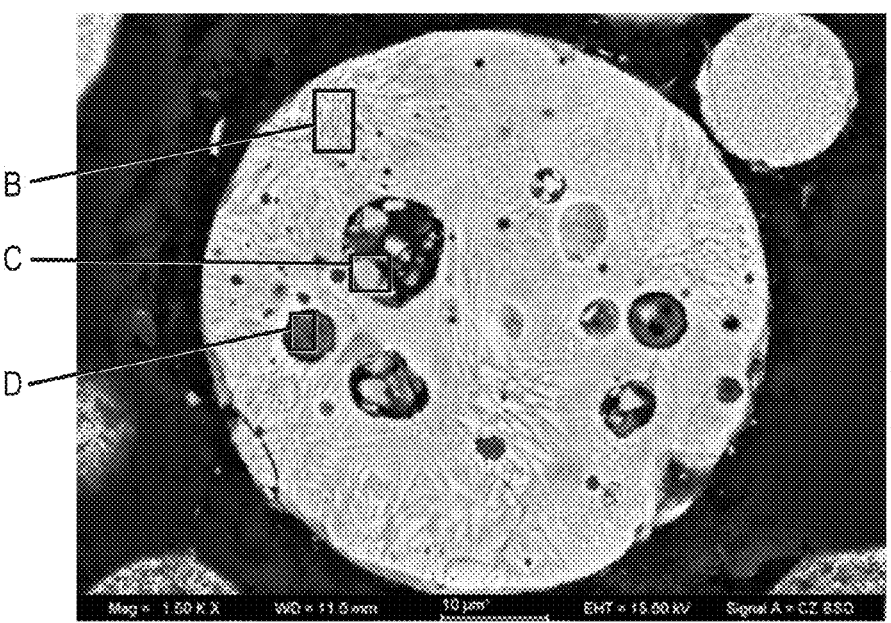
FIG. 7A is an SEM image of a polished cross-section of an epoxy-embedded fused particle according to still further embodiments of the disclosure.
Figure 7B:
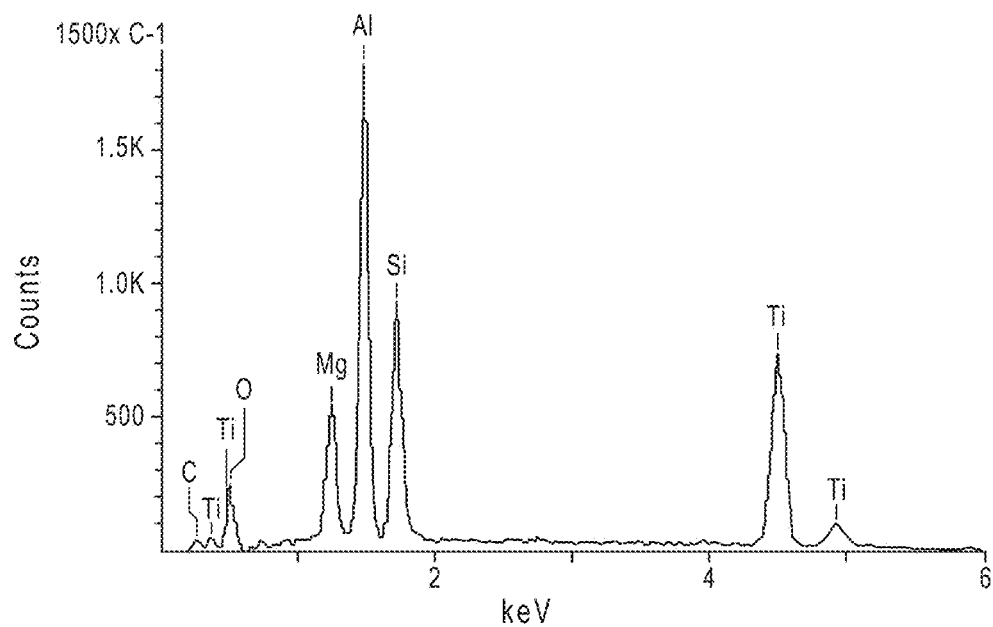
FIG. 7B-D are EDX spectra of regions B-D in FIG. 7A.
Figure 7C:
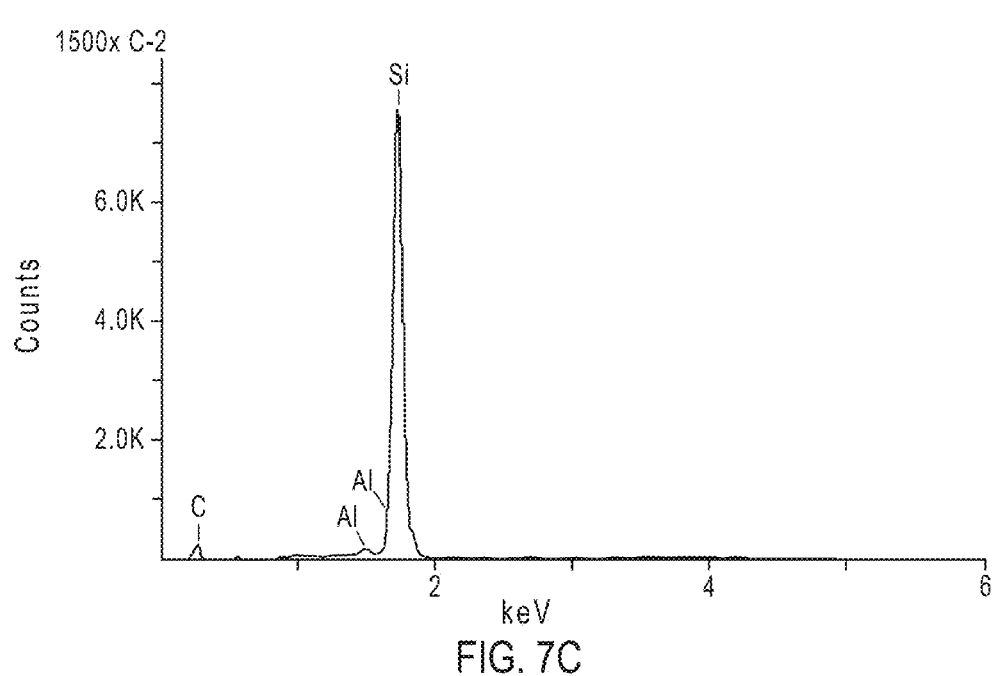
Figure 7D:
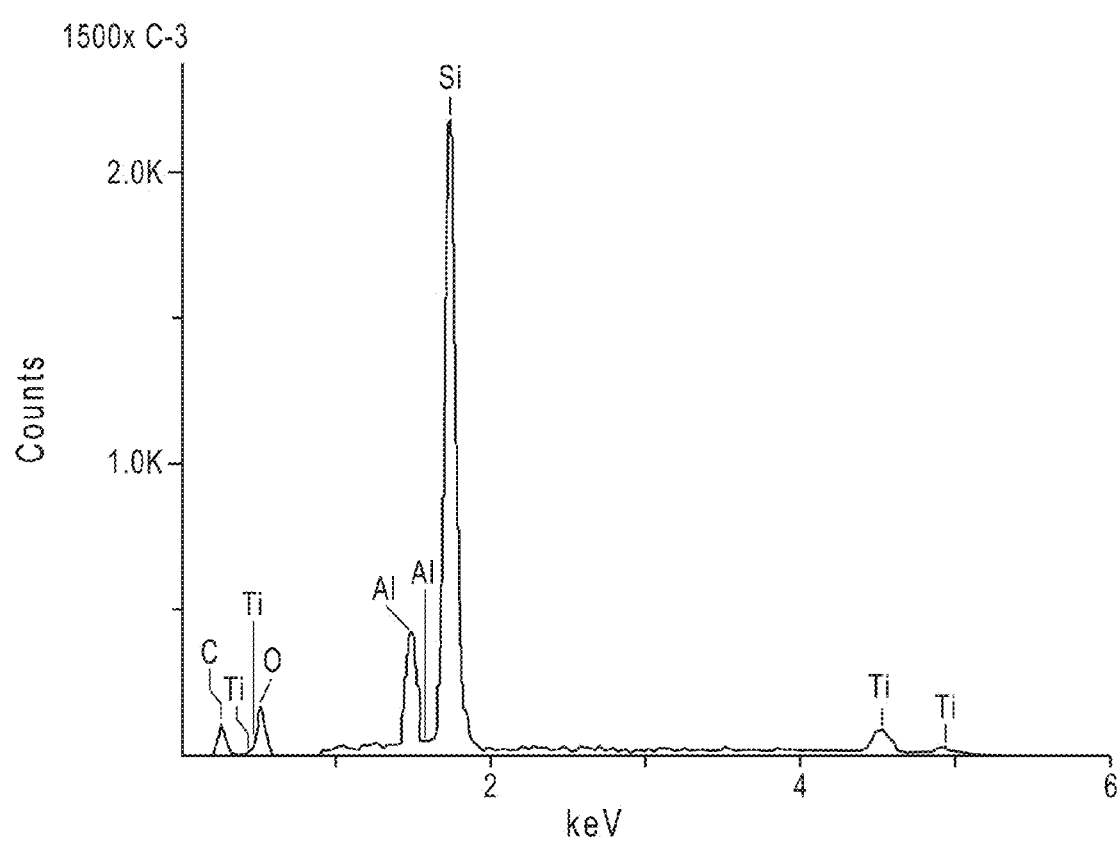

FIG. 7A is an SEM image of a polished cross-section of an epoxy-embedded fused particle produced by spray-drying composition A followed by four passes through plasma torch A. Without wishing to be bound by theory, it is believed that, due to multiple passes through the plasma torch, some particles first passed through the hot (central) zone to form a fused particle, and then passed through a cooler (peripheral) zone in subsequent passes, thereby undergoing crystallization. FIGS. 7B-D are EDX spectra of regions B-D of the larger particle illustrated in FIG. 7A, respectively, illustrating Ti-rich cordierite and aluminum titanate as the main phases. The larger particle shows needle-type crystallization around initial nucleation centers as well as pockets of alumina and titania. In contrast, the smaller particle also pictured in FIG. 7A shows a more homogenous, finer phase distribution.

FIG. 5 illustrate that a significant fraction of the powder captured from the low power plasma torch after one pass is still in its initial agglomerated particle state, as shown in the SEM cross-sectional images (the fine original raw material phases exhibiting characteristic phase contrast, phase size, and phase distribution). After four passes, it is believed that most of the particles passed at least once through the center of the torch and became fused at some point. Almost no original agglomerates are visible in the SEM powder cross-sectional image of FIG. 6 after four passes. However, FIGS. 6-7 also illustrate that after four passes a significant fraction of the powder captured from the low power plasma torch was effectively fused, but subsequently underwent crystallization during one of the subsequent passes, when the particle did not pass through the high temperature central torch. The SEM cross sectional images thus show some amorphous, homogeneous fused particles, but also particles that underwent crystallization during cooling or during passes through colder zones of the torch. Those particles show either initial stages of crystallization or complete crystallization into a pattern of fine aluminum titanate pseudobrookite crystals and cordierite. Those crystallized particles can be fully crystallized or may still contain fractions of amorphous (in this case silicate) glass.

Plasma Torch B

Agglomerated particles produced by spray-drying compositions A and B were plasma melted using an atmospheric thermal RF inductively coupled plasma operating at 3-5 MHz and 60 kW. A PN50 torch with spheroidization reactor and SG1270-260 probe were used with an $Ar/O_2$ mixture as the plasma gas. The median particle size of compositions A and B was 30 microns.

Figure 8:
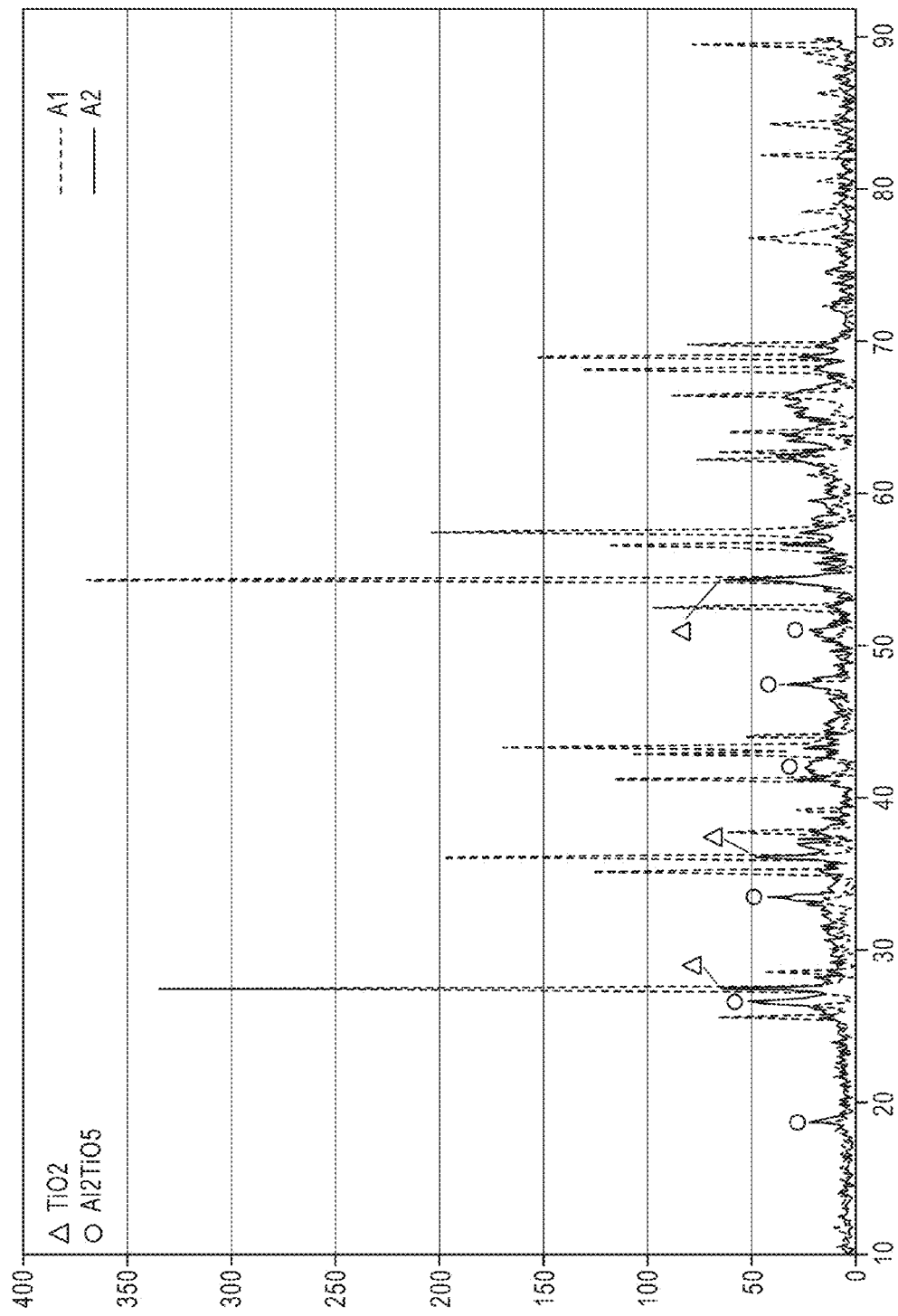
FIG. 8 is an XRD pattern of spray-dried particles as compared to fused particles according to certain embodiments of the disclosure.
Figure 9:
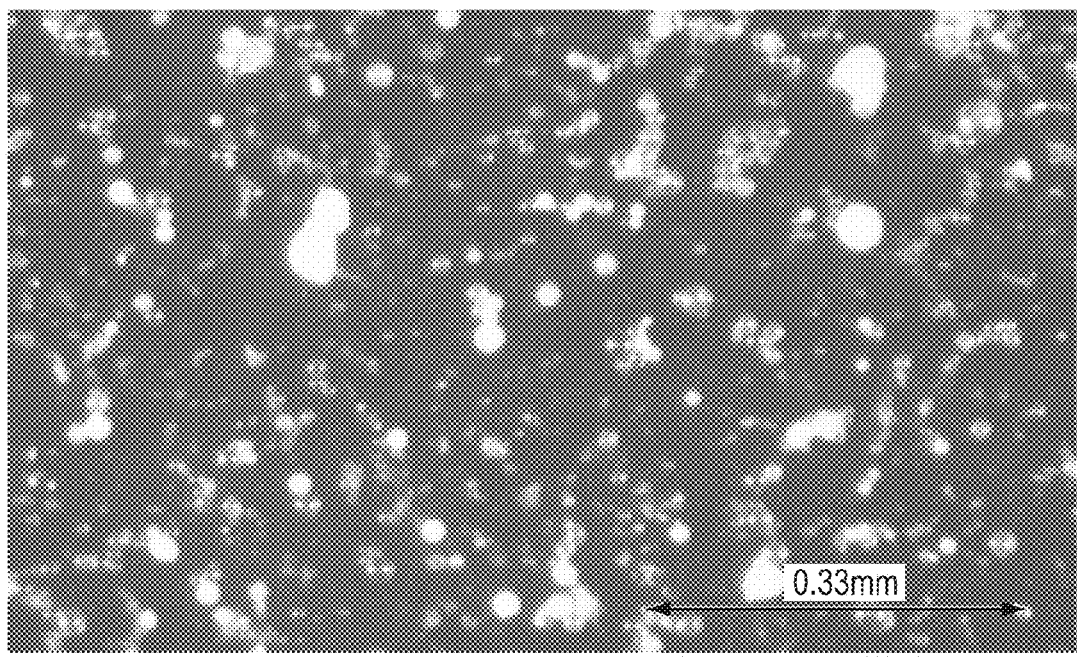
FIG. 9 is an optical microscope image of fused particles according to various embodiments of the disclosure.

FIG. 8 is an XRD pattern of agglomerated particles made by spray-drying composition A (A1) as compared to fused particles obtained after a single pass through plasma torch B (A2). Some peaks can still be seen in pattern A2, indicating that the fused particles are not perfectly amorphous; however, compared to a fully crystalline product the peak intensity is small. The fused particles were overall amorphous with small amounts of aluminum titanate and titania as minor crystalline phases. The powders produced using plasma torch B were observed to be highly transparent (like glass) under the optical microscope (see FIG. 9). The smaller particles in FIG. 9 exhibit the typical glow of glassy transparent particles, whereas the larger beads are less transparent and have a more crystalline appearance.

Figure 10A:
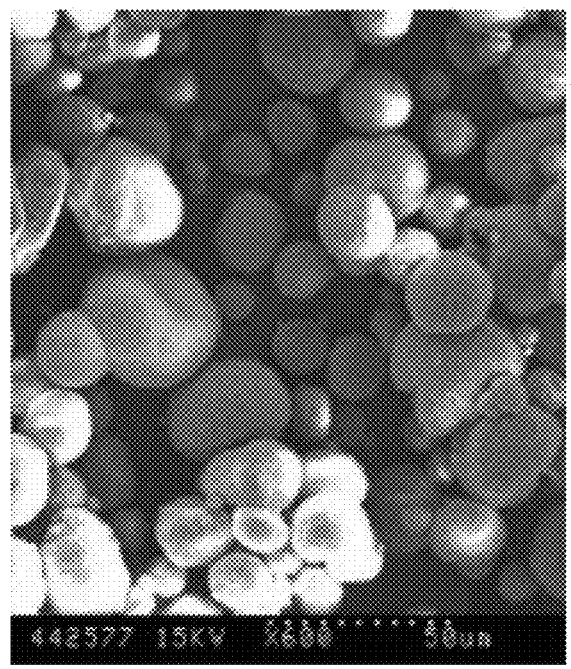
FIG. 10A is an SEM image of spray-dried particles according to additional embodiments of the disclosure.
Figure 10B:
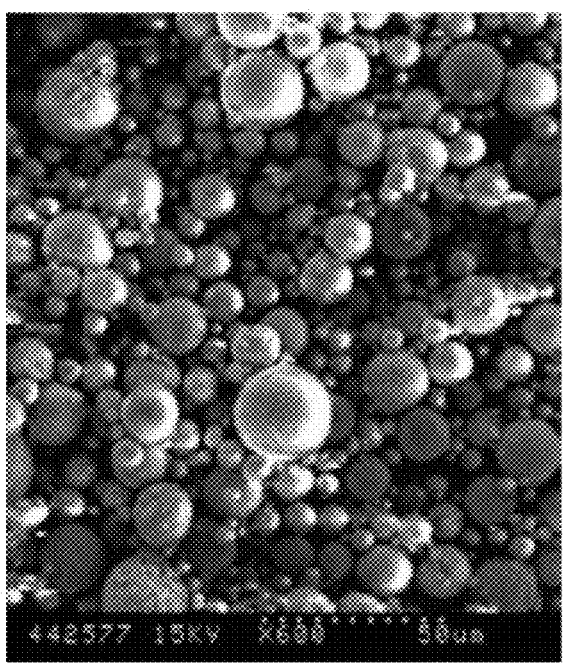
FIG. 10B is an SEM image of fused particles according to further embodiments of the disclosure.
Figure 10C:
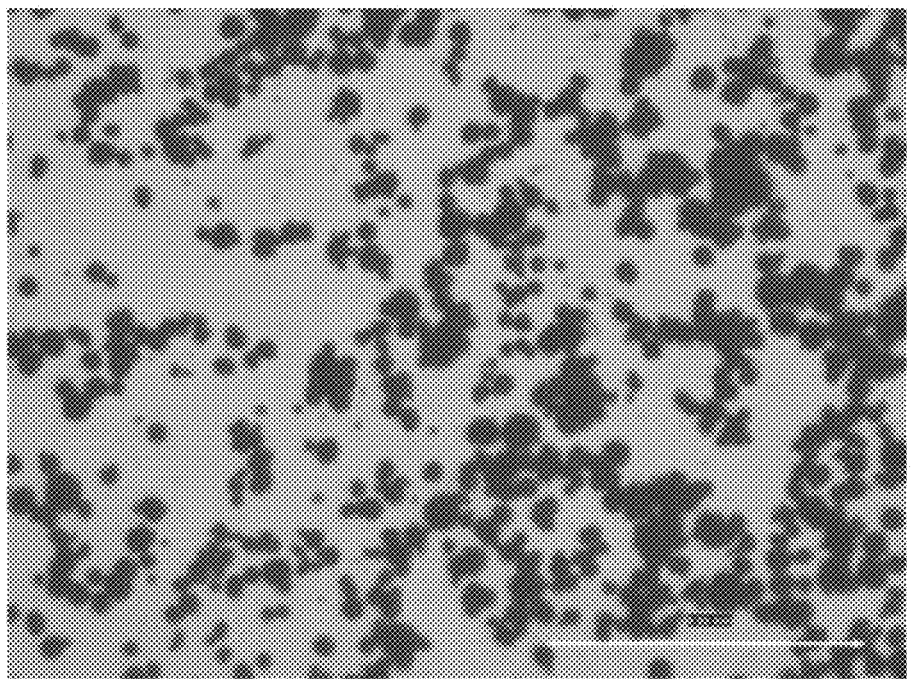
FIG. 10C is an optical microscope image of the spray-dried particles of FIG. 10A.
Figure 10D:
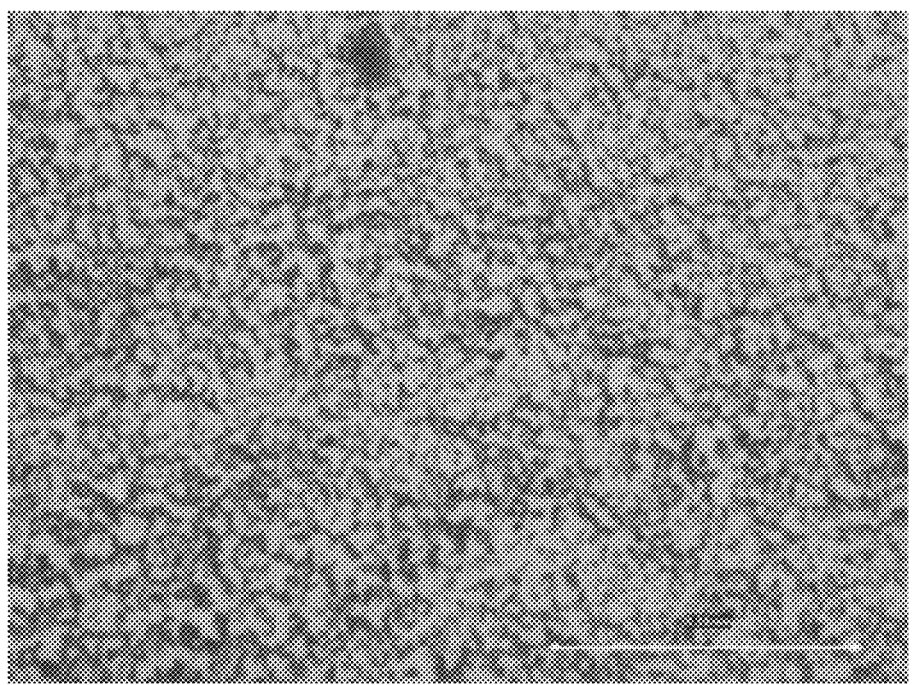
FIG. 10D is an optical microscope image of the fused particles of FIG. 10B.

FIG. 10A is an SEM image of agglomerated particles produced by spray-drying a coarse mixture of composition A. FIG. 10B is an SEM image of the fused particles of FIG. 10A after a single pass through plasma torch B. Similarly, FIG. 10C is an optical microscope image of the coarse spray-dried agglomerated particles of composition B, whereas FIG. 10D is an optical microscope image of the fused particles after a single pass through plasma torch B. The images in FIGS. 10A-D illustrate that the fused particles have a glassy appearance as compared to the agglomerated particles, with only larger particles showing a slightly crystalline appearance. Thus, FIGS. 10A-D confirm that the minor crystalline phases in the fused particles are due to larger powder particles that were too big to be fully fused in a single pass through plasma torch B.

Figure 11:
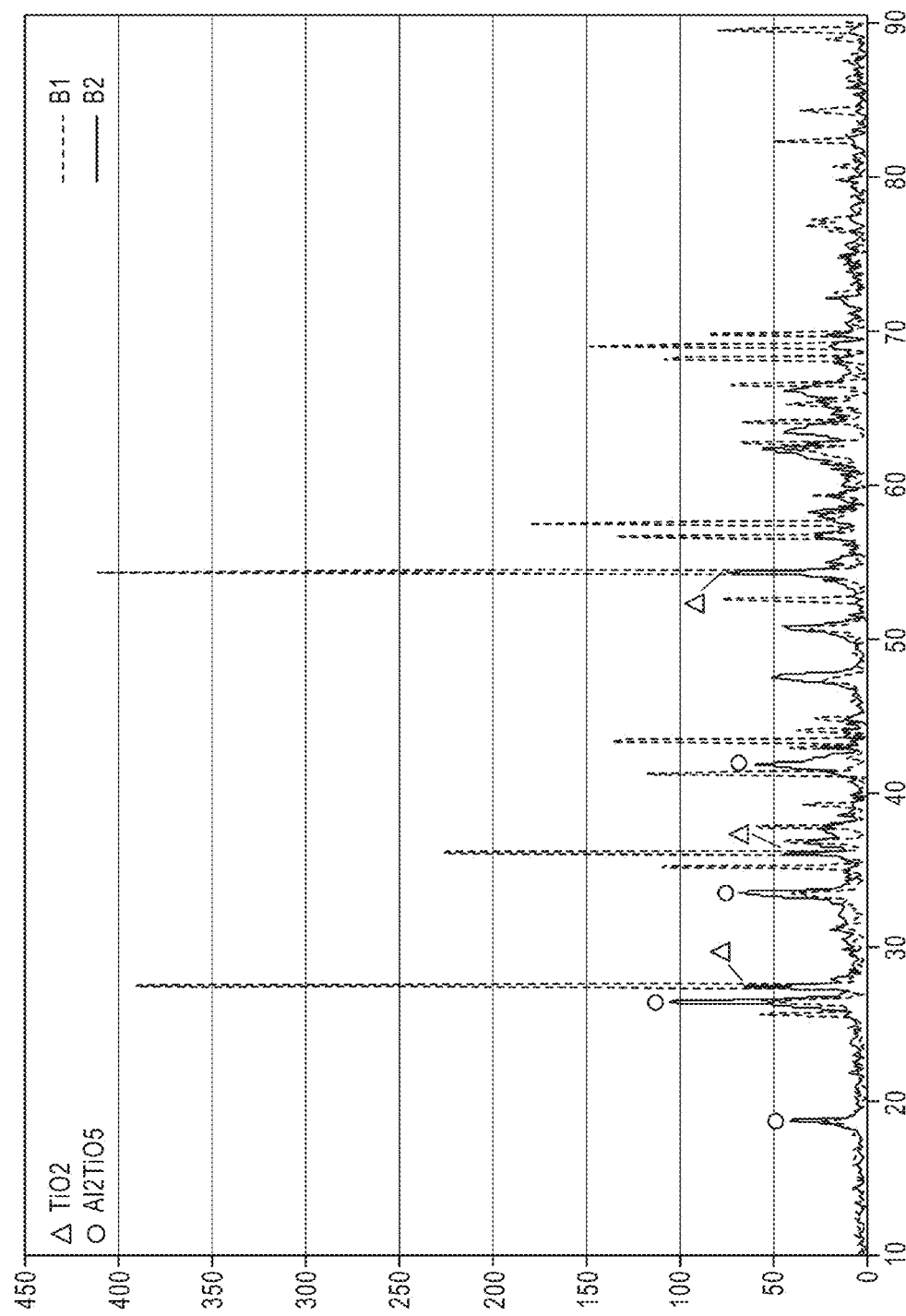
FIG. 11 is an XRD pattern of spray-dried particles as compared to fused particles according to certain embodiments of the disclosure.
Figure 12:
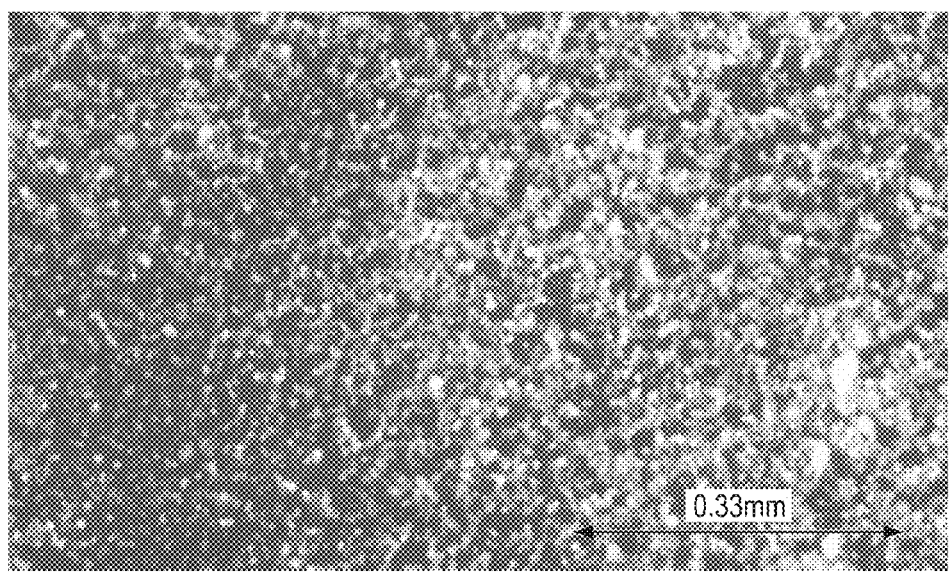
FIG. 12 is an optical microscope image of fused particles according to various embodiments of the disclosure.

FIG. 11 is an XRD pattern of agglomerated particles made by spray-drying composition B (B1) as compared to fused particles obtained after a single pass through plasma torch B (B2). Some peaks can still be seen in pattern B2, indicating that the fused particles are not perfectly amorphous; however, compared to a fully crystalline product the peak intensity is small. The fused particles were overall amorphous with small amounts of aluminum titanate and alumina as minor crystalline phases. The powders produced using plasma torch B were observed to be highly transparent (like glass) under the optical microscope (see FIG. 12). The smaller particles in FIG. 12 exhibit the typical glow of glassy transparent particles, whereas the larger beads are less transparent and have a more crystalline appearance.

Annealing

Figure 13A:
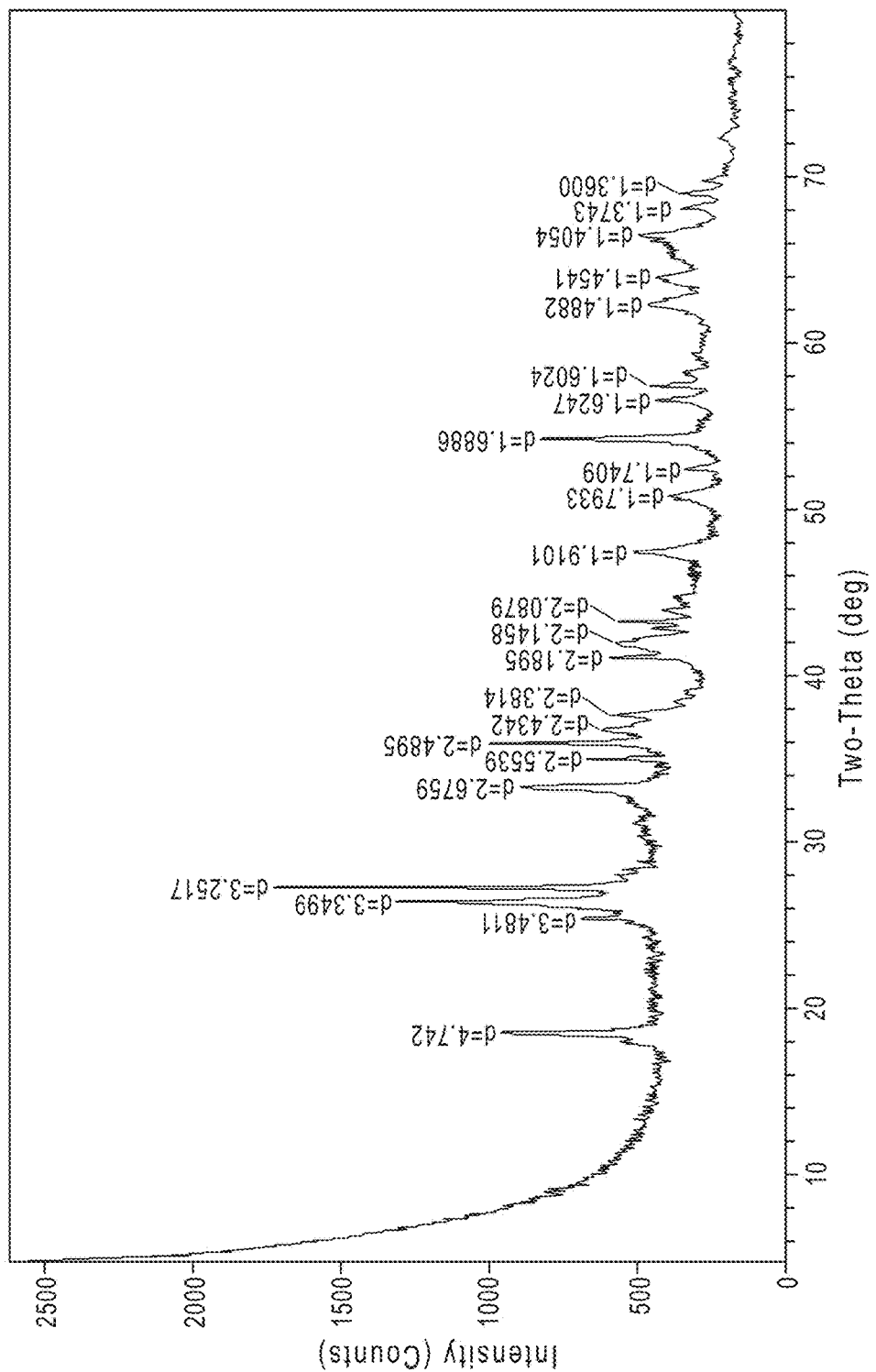
Figure 14A:
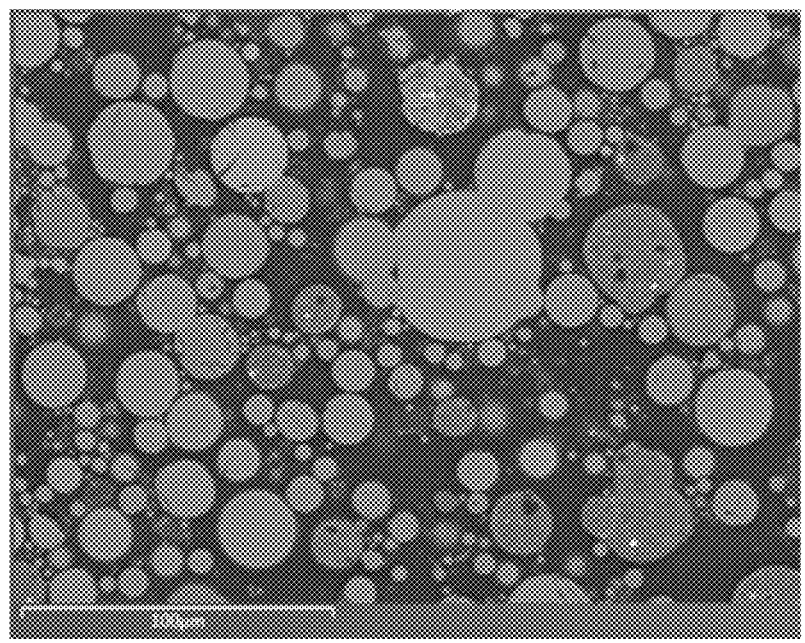
FIG. 14A is an SEM image of a polished cross-section of epoxy-embedded fused particles after annealing according to further embodiments of the disclosure.
Figure 14B:
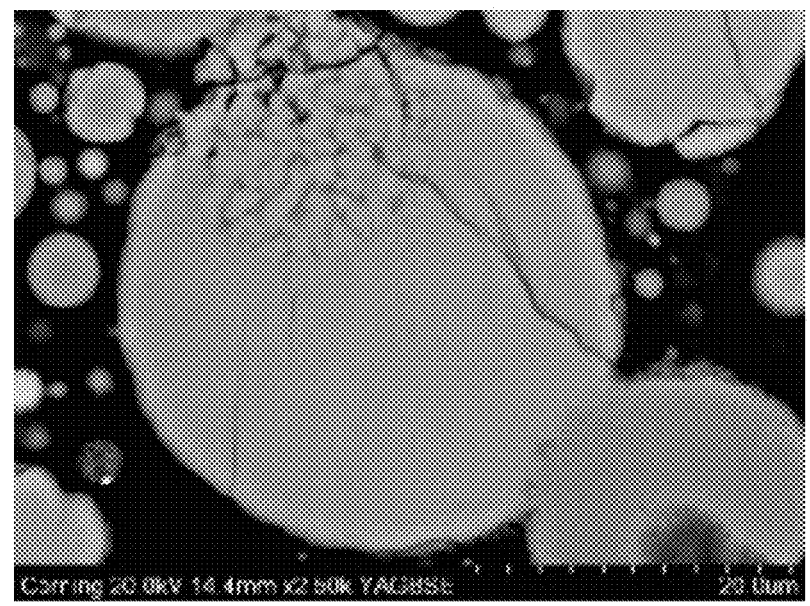
FIG. 14B is an SEM image of a single fused particle of FIG. 14A that has not undergone crystallization.
Figure 14C:
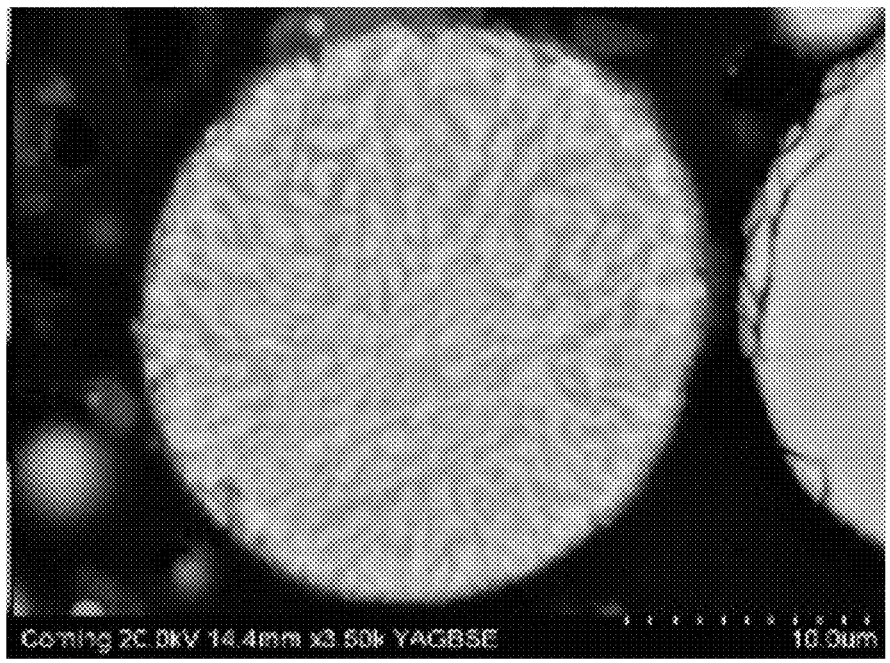
FIG. 14C is an SEM image of a single fused particle of FIG. 14A that has undergone crystallization.
Figure 15A:
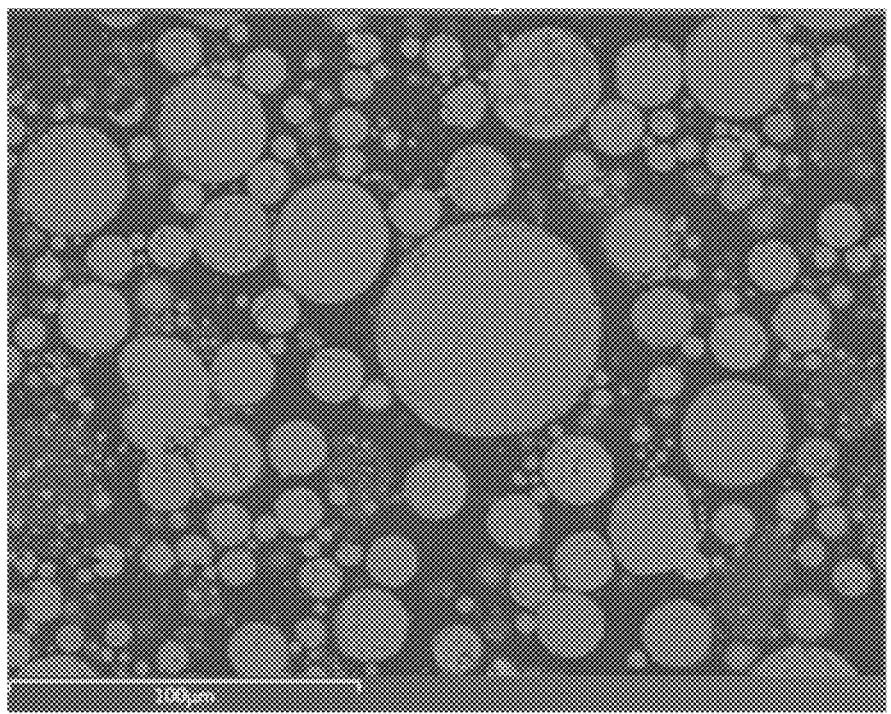
FIG. 15A is an SEM image of a polished cross-section of epoxy-embedded fused particles after annealing according to further embodiments of the disclosure.
Figure 15B:
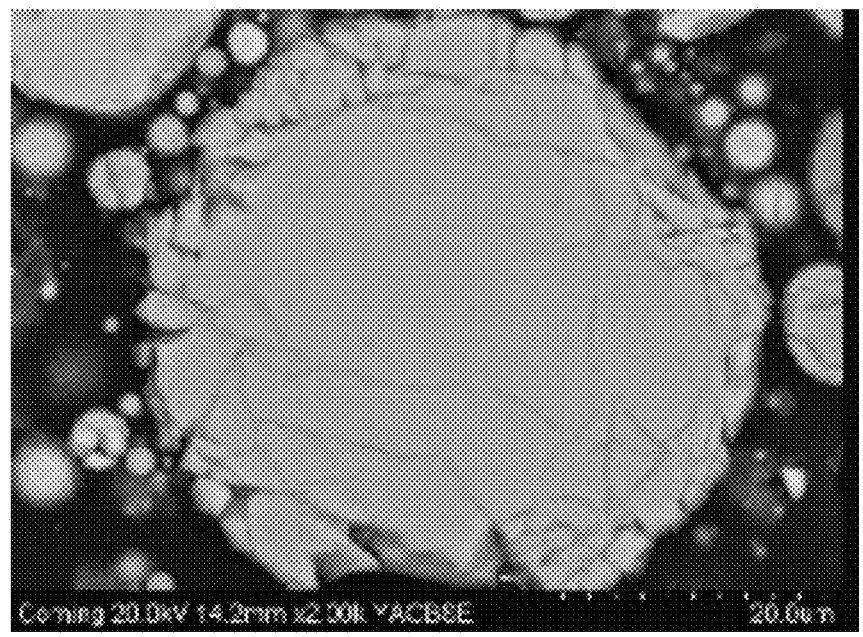
FIG. 15B is an SEM image of a single fused particle of FIG. 15A that has not undergone crystallization.
Figure 15C:
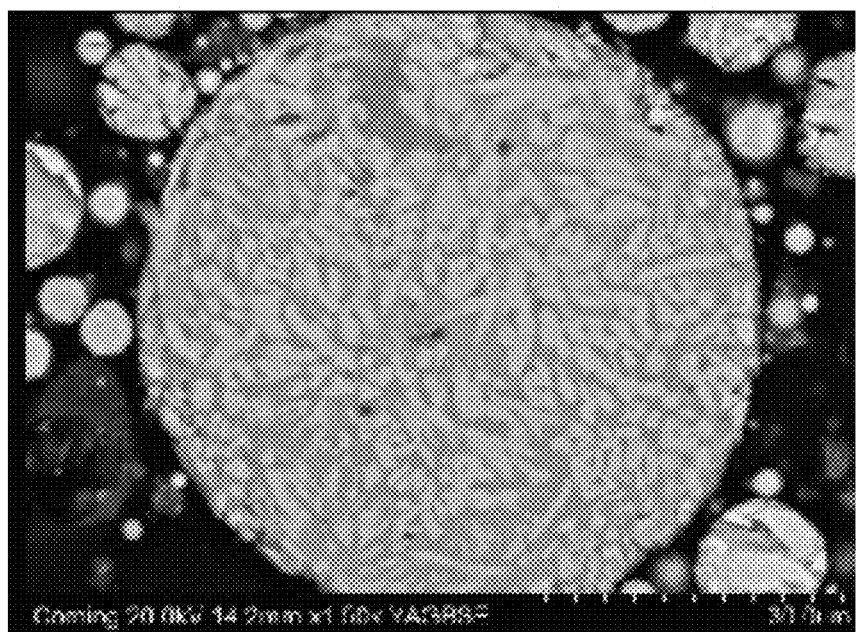
FIG. 15C is an SEM image of a single fused particle of FIG. 15A that has undergone crystallization.

After melting with plasma torch A or B, fused particles of compositions A and B were annealed using various ceramming schedules. FIG. 13A is an XRD pattern for fused particles of composition A (melted with plasma torch A) after annealing in air at 800° C. for one hour. FIG. 13B is an XRD pattern for similarly treated fused particles of composition B. Both patterns show highly amorphous particles with only minor quantities of crystalline phases. FIG. 14A is an SEM image of a polished cross-section of the fused particles of composition A embedded in epoxy (corresponding to FIG. 13A). It can be seen that a fraction of the powder was not fused (dark particle contrast) and also that another fraction of the powder underwent crystallization during cooling (bright phase contrast within particle), while the largest fraction of the powder is amorphous (no contrast in particle). FIG. 14B is an SEM image of a single fused particle of composition A that has not undergone any crystallization, but became brittle during cooling, cutting, and/or polishing due to stress. FIG. 14C is an SEM image of a single fused particle of composition A that underwent crystallization during cooling and exhibits the phase contrast of a mixture of several finely interwoven crystalline phases. Similarly, FIG. 15A is an SEM image of a polished cross-section of the fused particles of composition B embedded in epoxy (corresponding to FIG. 13B), which reflects findings similar to those for powder A. FIG. 15B is an SEM image of a single fused particle of composition B that has not undergone any crystallization, but became brittle during cooling, cutting, and/or polishing due to stress. FIG. 15C is an SEM image of a single fused particle of composition B that underwent crystallization, forming aluminum titanate crystallites in a matrix phase. The aluminum titanate grains had a size range from about 1 to 3 microns and were separated by the matrix phase.

Table I below sets forth the crystalline phase fractions (as derived from XRD data) for fused particles of compositions A and B after melting with plasma torch B and subsequent annealing steps with varying temperature and/or time. FIGS. 16-17 are SEM images of the corresponding glass-ceramic particles.

Figure 16A:
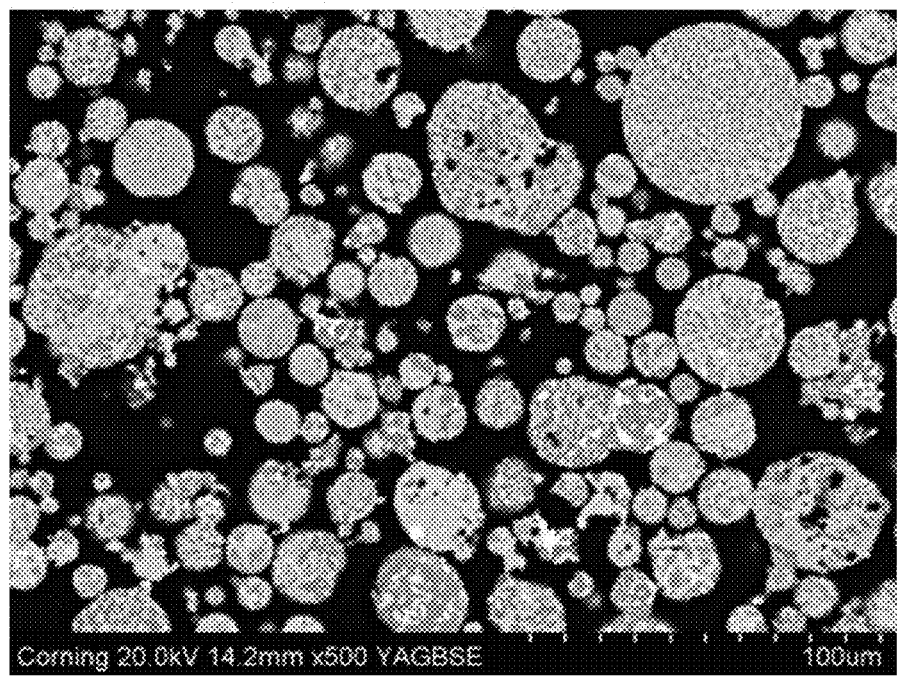
FIGS. 16A-F are SEM images of fused particles after annealing using various ceramming schedules according to certain embodiments of the disclosure.
Figure 16B:
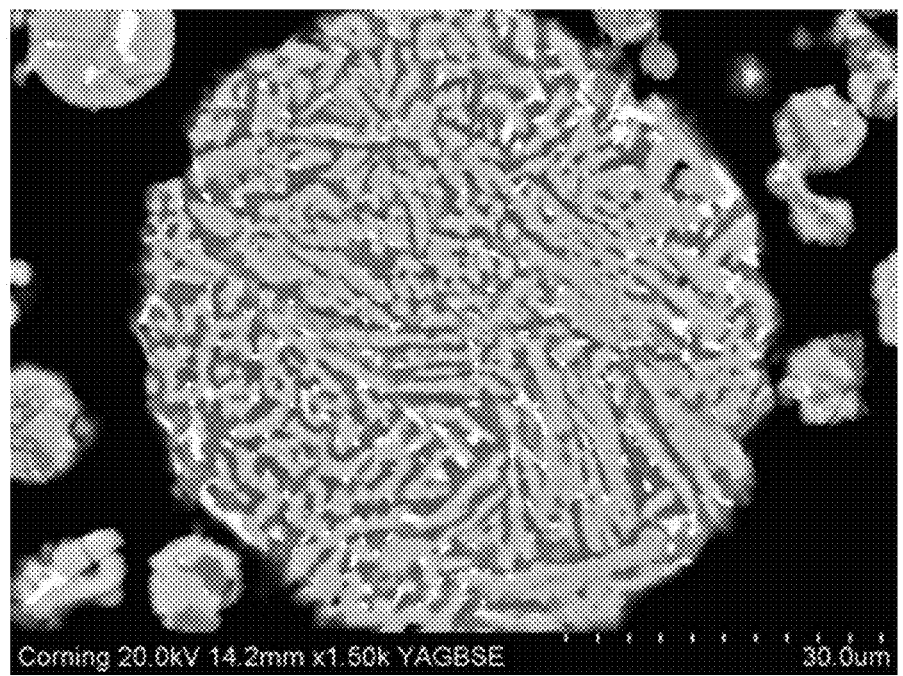
Figure 16C:
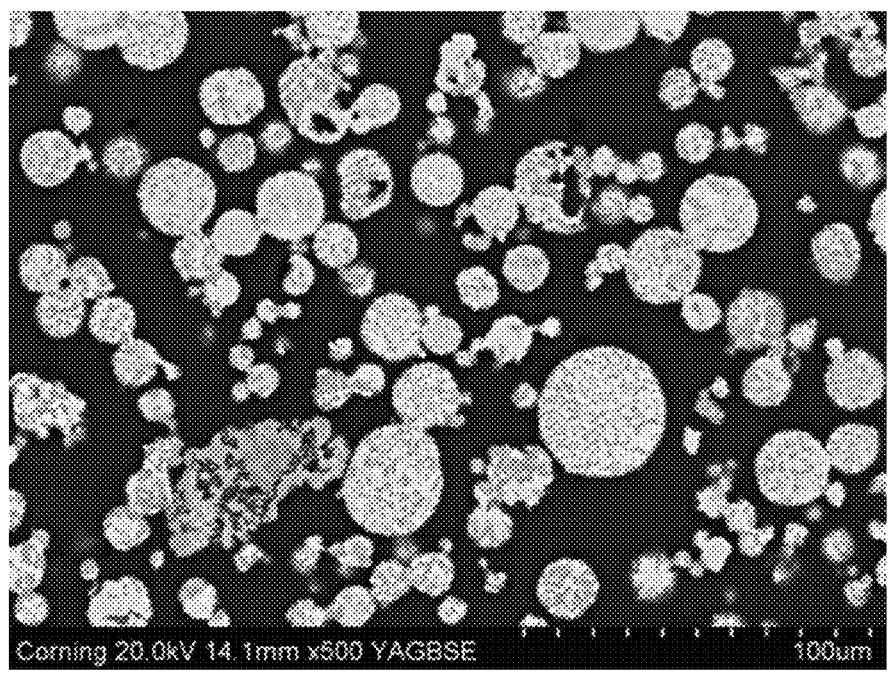
Figure 16D:
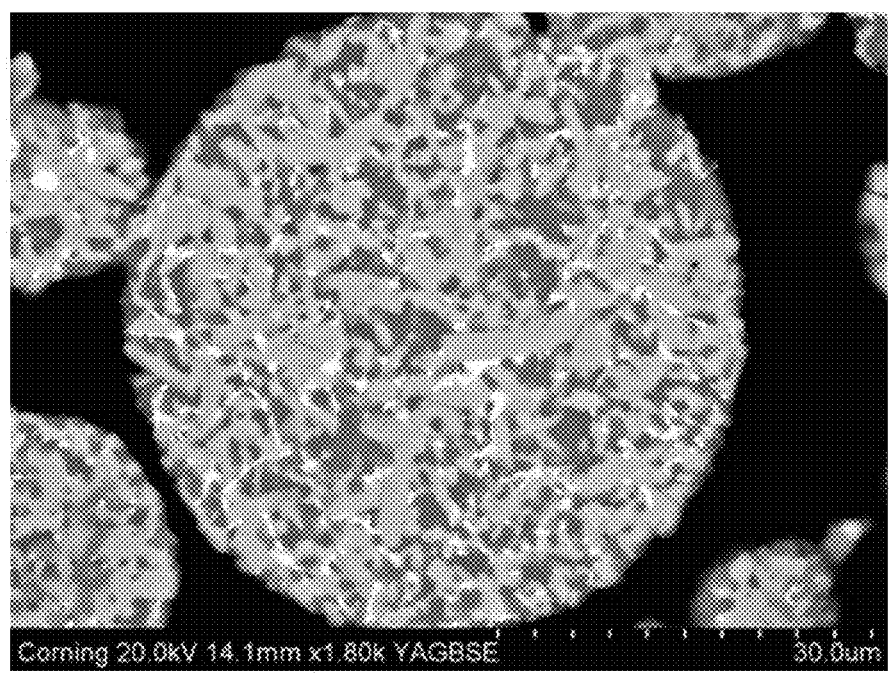
Figure 16E:
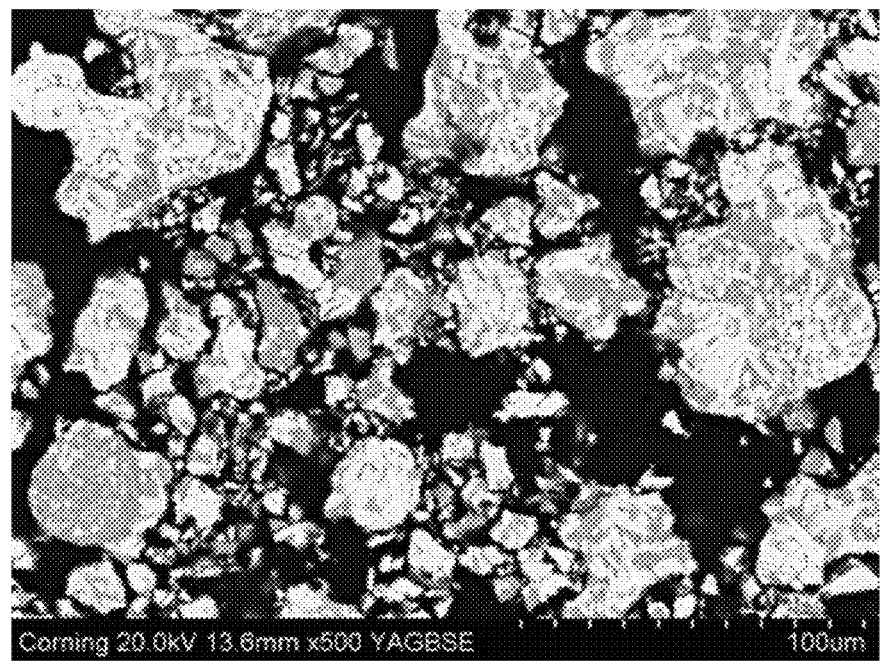
Figure 16F:
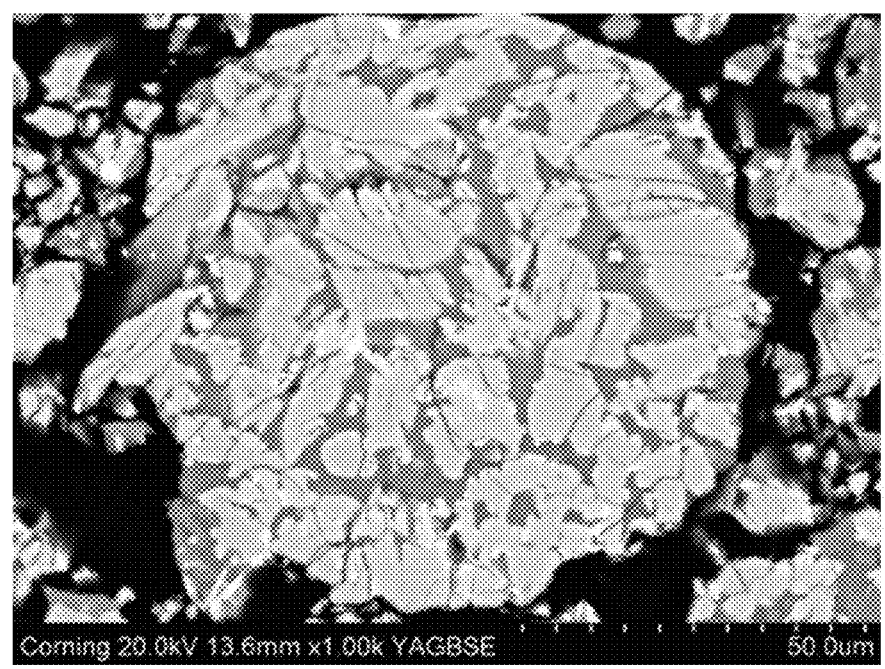

FIG. 16A (100 µm scale bar) and FIG. 16B (30 µm scale bar) depict SEM images for glass-ceramic particles produced from composition A after annealing for one hour at 1300° C. The SEM images show that most particles have undergone crystallization and only a few small particles have not undergone crystallization. An interwoven phase mixture of aluminum titanate and cordierite formed with fine streaks of ceria. The grains were elongated to lamellar in shape with an average size ranging from 1-3 microns. The microstructure can be compared to microstructures that are obtained in metallurgy as a result of cooling eutectics. All aluminum titanate grains were separated by cordierite and were not in direct contact. FIG. 16C (100 µm scale bar) and FIG. 16D (30 µm scale bar) are SEM images of glass-ceramic particles of composition A after additional annealing time at the same temperature (1300° C. for 4 hours). The microstructure became coarser and the aluminum titanate grains became interconnected. The grain size was on the order of about 3 microns and the lamellae were wider. FIG. 16E (100 µm scale bar) and FIG. 16F (50 µm scale bar) are SEM images of glass-ceramic particles of composition A after annealing at 1360° C. for one hour. This ceramming schedule produce a microstructure with grain sizes more similar to materials obtained by reactive sintering; however, the phase distribution was observed to be much more homogeneous. As expected, after higher temperature annealing that is closer to the traditional state of the art, traditional state-of-the-art microstructure is also observed with the same high microcrack densities that are typically found in reaction sintered materials.

Figure 17A:
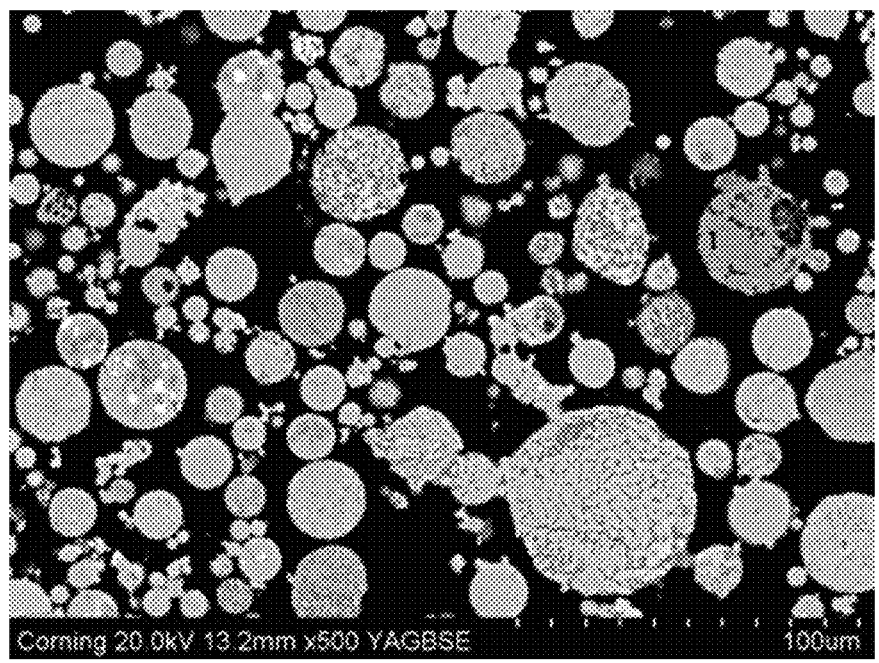
FIG. 17A-F are SEM images of fused particles after annealing using various ceramming schedules according to other embodiments of the disclosure.
Figure 17B:
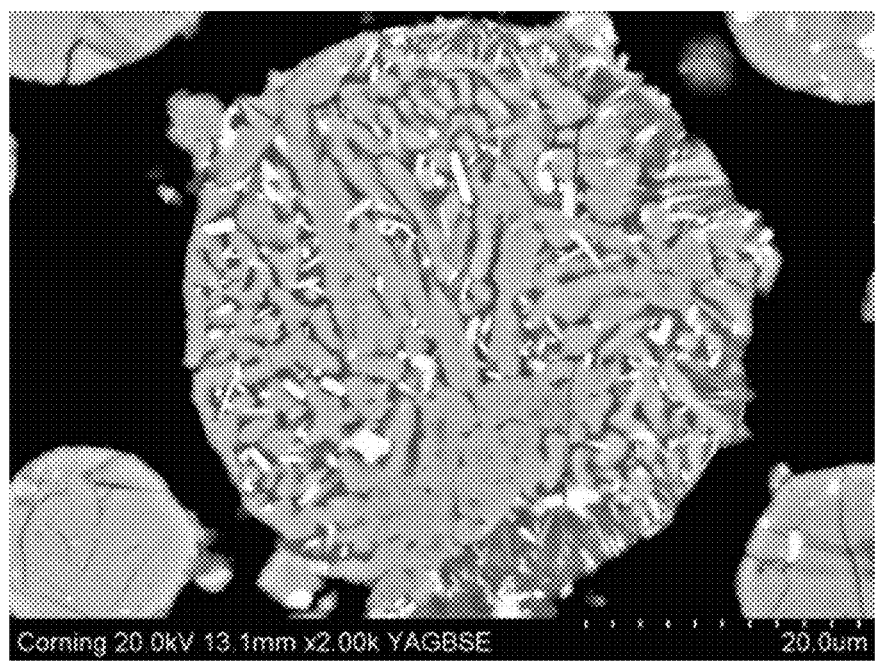
Figure 17C:
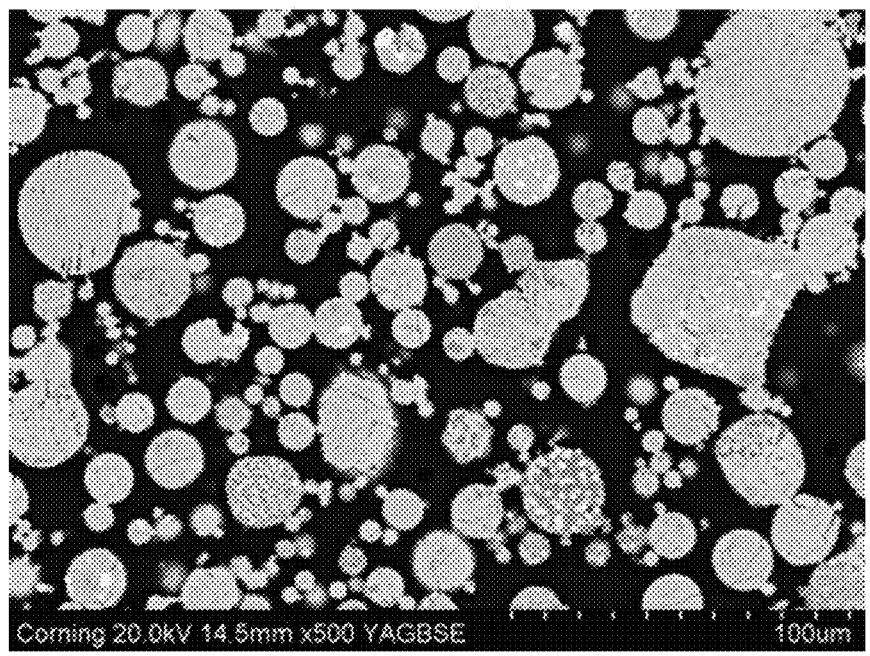
Figure 17D:
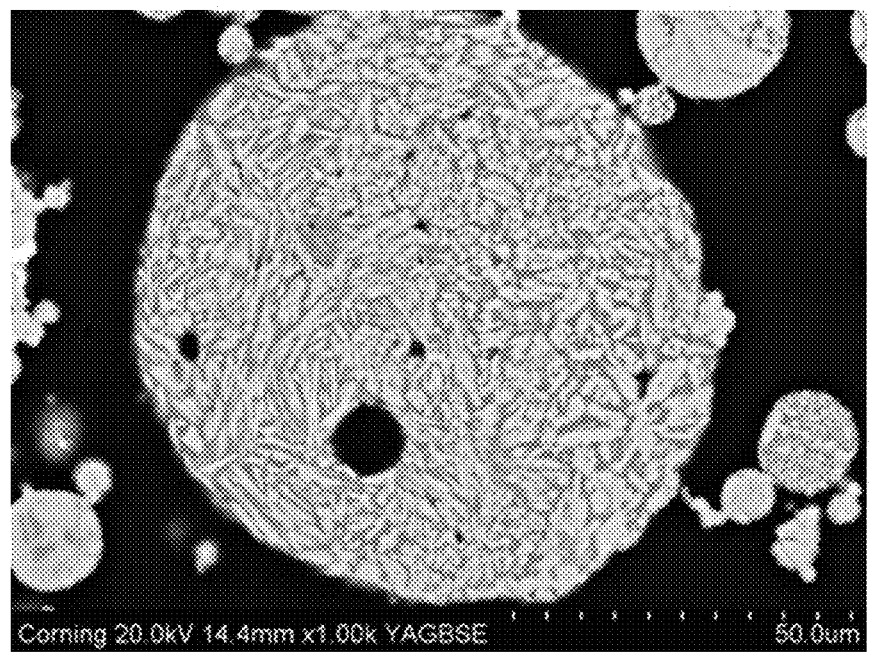
Figure 17E:
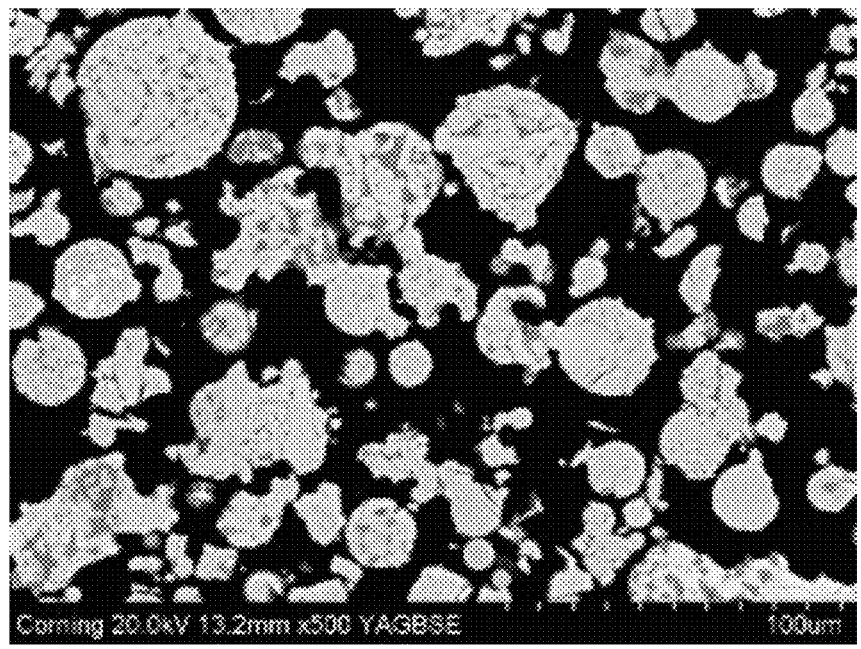
Figure 17F:
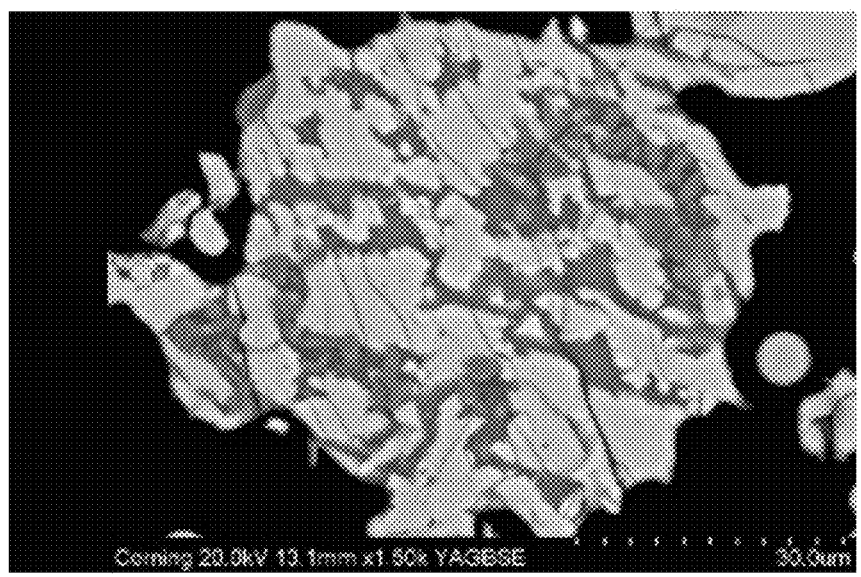

FIG. 17A (100 µm scale bar) and FIG. 17B (20 µm scale bar) depict SEM images for glass-ceramic particles produced from composition B (fused with plasma torch B) after annealing for one hour at 1300° C. FIG. 17C (100 µm scale bar) and FIG. 17D (50 µm scale bar) depict SEM images for glass-ceramic particles produced from composition B after annealing for four hours at 1300° C. FIG. 17E (100 µm scale bar) and FIG. 17F (30 µm scale bar) depict SEM images for glass-ceramic particles produced from composition B after annealing for one hour at 1360° C. Similar observations were made for composition B as for composition A. Again, it was observed that very high temperature annealing leads to the traditional, highly microcracked microstructures that are obtained by reactive sintering of powders at similar temperatures. The bright gray phase is aluminum titanate, the medium gray phase is mullite, the dark gray phase is cordierite, and black lines are microcracks.

COMPARATIVE EXAMPLES

Figure 18A:
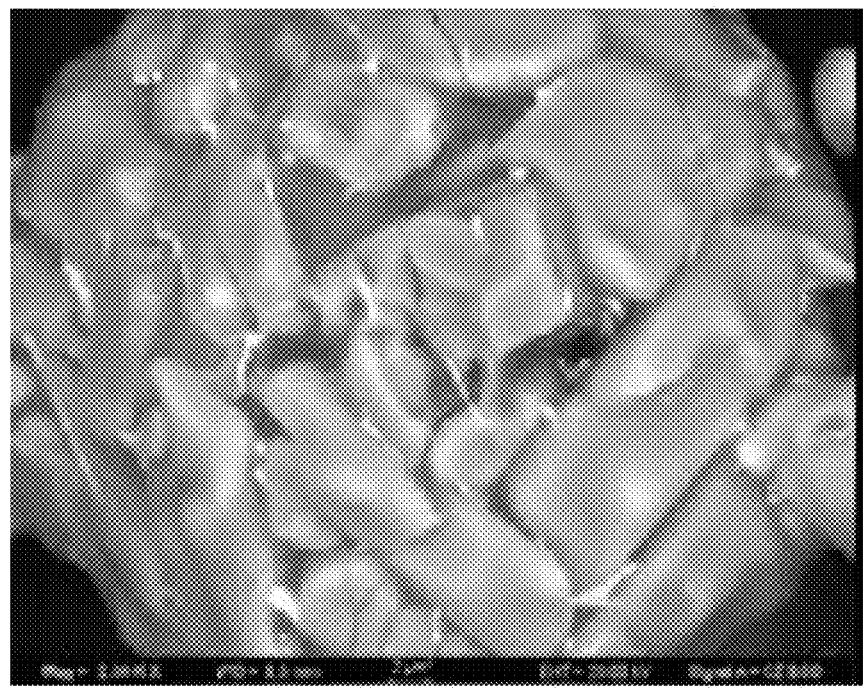
FIGS. 18A-B are SEM images of annealed spray-dried particles that were not plasma melted.
Figure 18B:
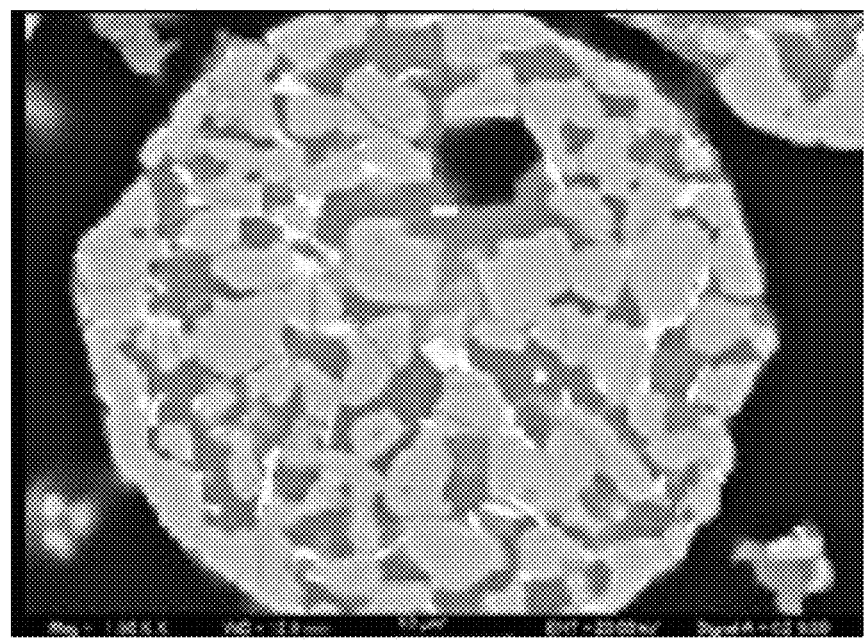
Figure 19A:
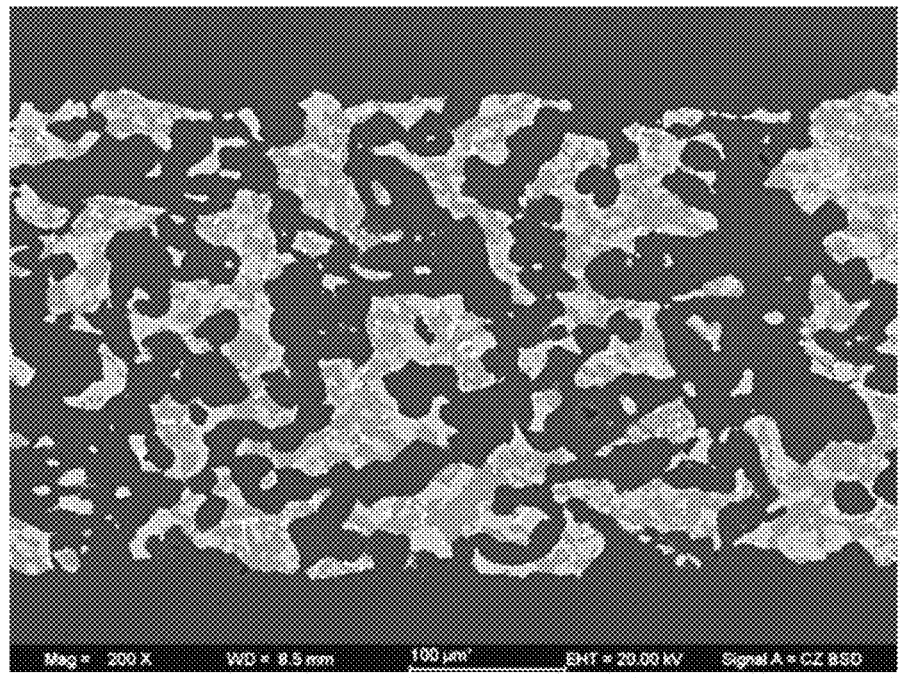
FIGS. 19A-B are SEM images of polished cross-sections of annealed material that was not spray dried or plasma melted.
Figure 19B:
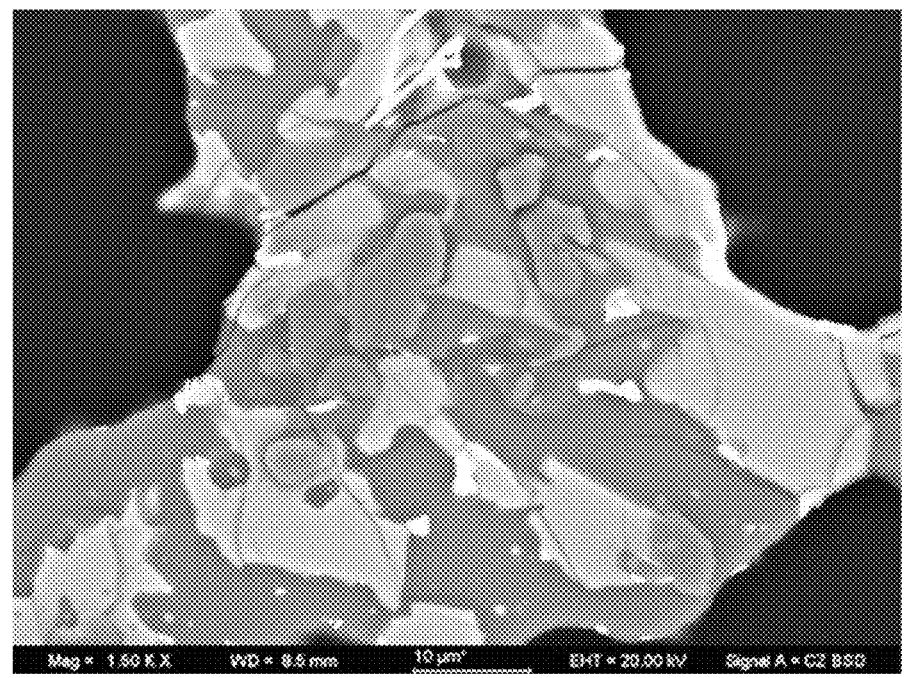

Spray-dried beads of composition A (not plasma melted) were reaction sintered at 1350° C. for four hours. Complete conversion of the bead to a glass-ceramic was not achieved at this time and temperature, as shown in FIGS. 18A-B. The bright gray phase is aluminum titanate, the dark gray phase is cordierite glass, and the bright phase is cerium titanate. Black lines are microcracks. Raw material of composition A was then fired at 1360° C. for 16 hours to reach complete conversion of the raw materials. FIGS. 19A-B are SEM images of a polished cross-section of the sintered material.

TABLE I

Fractional Crystalline Phases for Different Ceramming Schedules**

| Composition Temperature/Time | AT | $Al_{2(1-x)}Mg_xTi_{(1+x)}O_5$ value of x | Cordierite | Mullite | Corundum | Rutile | $CeTi_2O_6$ | Sapphirine | Spinel |
|---|---|---|---|---|---|---|---|---|---|
| A 1300 C./1 hr | 59 | 0.18 | 19 | 1 | 0.0 | 1 | 2.5 | 4.5 | 0 |
| A 1300 C./4 hr | 64 | 0.20 | 19 | 9 | 0.0 | trace | 2.0 | 4.4 | 0 |
| A 1360 C./1 hr | 64 | 0.21 | 14 | 1 | 0.0 | 0 | 1.6 | 7.1 | 0 |
| B 1300 C./1 hr | 85 | 0.16 | 2.5 | 4 | 0.6 | 2 | 0.0 | 1.9 | 2 |
| B 1300 C./4 hr | 87 | 0.16 | 3.0 | 3 | 0.5 | 1 | 0.0 | 2.2 | 1 |
| B 1360 C./1 hr | 94 | 0.19 | 0.6 | 0 | 0.0 | 0 | 0.0 | 3.2 | 2 |

**amorphous phases and glass are not accounted for

The bright gray phase is aluminum titanate, the medium gray phase is mullite, the dark gray phase is cordierite, and bright phase is cerium titanate. Black lines are microcracks.

During reactive sintering, a number of different parallel and consecutive reactions can occur combined with short and long range diffusional transport, which can lead to phase compositions and microstructures that evolve during reactive sintering via a large number of intermediate phases. The resulting microstructure is typically obtained after extended periods of time at high temperatures such that all reaction steps are terminated. As a result of long exposure to high temperature, significant grain growth can occur and the resulting grains may be large in size and interconnected. For example, the aluminum titanate, cordierite and mullite grain sizes can be on the order of 10-20 microns, with an equiaxial grain shape and a microstructure reflecting a high level of spatial inhomogeneity. The assembly of phases was exposed for a long period of time at high temperature. Excessive sintering can result in a very coarse microstructure. Additionally, at high temperature all reaction-related stress may be relaxed such that only differences in thermal expansion during cooling may lead to cooling-related stresses resulting in microcracking. During ceramming of the fused beads at lower temperatures, the temperatures may not be sufficient to activate such stress relaxation by diffusion-transport at the ceramming temperature, such that crystallization- and reaction-volume-change-related stresses may contribute to microcracking in cerammed, fused beads.

FIGS. 18A-B and 19A-B demonstrate that different batch compositions and heat treatments can result in different ceramic phase compositions and microstructures. The recrystallized plasma-melted microstructure offers a finer phase distribution as well as different phase compositions and ratios as compared to reactive sintering methods. Ceramic or glass-ceramic particles made according to the instant methods may, for example, have little or no glass phase in the fully recrystallized fused material. For example, aluminum titanate and cordierite grains can coexist at their interface without separation by intergranular glass, as compared to traditional reaction sintered materials that comprise grains separated by intergranular glass.

What is claimed is:

1. A fused glass particle having an average particle size ranging from about 10 microns to about 50 microns, comprising silica and alumina in a combined amount of greater than about 45 wt %, and comprising less than about 5% crystalline phase, wherein the fused glass particle is substantially homogeneous, and wherein the fused glass particle has a $T_g$ of at least about 1600° C.

2. A ceramic or glass-ceramic article made from at least one fused glass particle of claim 1 and comprising less than 5% residual glass phase.

3. The ceramic or glass-ceramic article of claim 2, wherein the ceramic or glass-ceramic article has a porosity of at least about 40%.

4. The ceramic or glass-ceramic article of claim 2, wherein the CTE of the ceramic or glass-ceramic article is less than about $20 \times 10^{-7}$ $K^{-1}$ at a temperature ranging from 20° C. to 800° C.

5. The ceramic or glass-ceramic article of claim 2, wherein the ceramic or glass-ceramic article has a microcrack factor ranging from about 0.1 to about 8.

6. The ceramic or glass-ceramic article of claim 2, wherein the ceramic or glass-ceramic article comprises less than about 1% residual glass phase.

7. The ceramic or glass-ceramic article of claim 2, wherein the ceramic or glass-ceramic article is a honeycomb.

* * * * *

UNITED STATES PATENT AND TRADEMARK OFFICE
CERTIFICATE OF CORRECTION

PATENT NO. : 10,029,939 B2
APPLICATION NO. : 14/633695
DATED : July 24, 2018
INVENTOR(S) : Monika Backhaus-Ricoult et al.

It is certified that error appears in the above-identified patent and that said Letters Patent is hereby corrected as shown below:

On the Title Page

Column 2, item (56), other publications, Line 4, delete "Microstructures Processing," and insert -- Microstructures and Processing, --, therefor.

Page 2, Column 2, item (56), other publications, Line 5, delete "spinet" and insert -- spinel --, therefor.

Page 2, Column 2, item (56), other publications, Line 6, delete "Isevier" and insert -- Elsevier --, therefor.

Signed and Sealed this
Second Day of June, 2020

Andrei Iancu
*Director of the United States Patent and Trademark Office*